US009110505B2

(12) United States Patent
Mastandrea, Jr.

(10) Patent No.: US 9,110,505 B2
(45) Date of Patent: Aug. 18, 2015

(54) WEARABLE MOTION SENSING COMPUTING INTERFACE

(75) Inventor: Nicholas J. Mastandrea, Jr., Chesterland, OH (US)

(73) Assignee: Innovative Devices Inc., Bedford Heights, OH (US)

( * ) Notice: Subject to any disclaimer, the term of this patent is extended or adjusted under 35 U.S.C. 154(b) by 7 days.

(21) Appl. No.: 13/640,422

(22) PCT Filed: Apr. 18, 2011

(86) PCT No.: PCT/US2011/032934
§ 371 (c)(1),
(2), (4) Date: Oct. 10, 2012

(87) PCT Pub. No.: WO2011/130752
PCT Pub. Date: Oct. 20, 2011

(65) Prior Publication Data
US 2013/0027341 A1    Jan. 31, 2013

Related U.S. Application Data

(60) Provisional application No. 61/324,824, filed on Apr. 16, 2010, provisional application No. 61/346,974, filed on May 21, 2010.

(51) Int. Cl.
*G06F 3/01*    (2006.01)
*G06F 3/038*   (2013.01)
(52) U.S. Cl.
CPC ............... *G06F 3/014* (2013.01); *G06F 3/017* (2013.01); *G06F 3/038* (2013.01)

(58) Field of Classification Search
CPC ................ G06F 3/033–3/0362; G06F 3/03; G06F 3/017; G06F 3/041; G06F 3/0488; G06F 3/014; G06F 3/038; G09G 5/08
USPC ........... 345/157–167, 173; 463/37, 38
See application file for complete search history.

(56) References Cited

U.S. PATENT DOCUMENTS

| 7,333,087 | B2 * | 2/2008 | Soh et al. ............. 345/156 |
| 7,636,645 | B1 * | 12/2009 | Yen et al. ............. 702/152 |
| 7,679,601 | B2 * | 3/2010 | Chang et al. ........... 345/156 |
| 8,125,448 | B2 * | 2/2012 | Ranta et al. ........... 345/158 |
| 8,139,031 | B2 * | 3/2012 | Calarco et al. ......... 345/163 |
| 8,246,462 | B1 * | 8/2012 | Tran et al. ............. 463/37 |
| 2003/0142065 | A1 * | 7/2003 | Pahlavan ............... 345/156 |
| 2003/0214481 | A1 | 11/2003 | Xiong |

(Continued)

FOREIGN PATENT DOCUMENTS

JP     2007109188 A      4/2007
KR     20040028074       12/2004

(Continued)

*Primary Examiner* — Tom Sheng
(74) *Attorney, Agent, or Firm* — Thompson Hine LLP

(57) ABSTRACT

An apparatus comprises a sensor configured to detect movement and generate movement data related to at least part of a detected movement; a messaging unit configured to create a message that is configured to include movement information based at least in part upon the movement data; a transmitter in data communication with the messaging unit and configured to transmit the message; and a housing configured to at least partially enclose at least one of the sensor, the messaging unit, and the transmitter, and including a finger grip configured to secure the housing to a human finger. Methods of using the apparatus are also provided.

15 Claims, 21 Drawing Sheets

(56) References Cited

U.S. PATENT DOCUMENTS

| | | | |
|---|---|---|---|
| 2005/0024332 A1* | 2/2005 | Chen | 345/163 |
| 2005/0052412 A1* | 3/2005 | McRae et al. | 345/158 |
| 2005/0172734 A1* | 8/2005 | Alsio et al. | 73/865.4 |
| 2005/0243656 A1* | 11/2005 | Vablais et al. | 368/121 |
| 2007/0131031 A1* | 6/2007 | Tsai et al. | 73/514.01 |
| 2008/0084385 A1* | 4/2008 | Ranta et al. | 345/157 |
| 2008/0211768 A1* | 9/2008 | Breen et al. | 345/157 |
| 2008/0214305 A1* | 9/2008 | Addington et al. | 463/36 |
| 2009/0153482 A1* | 6/2009 | Weinberg et al. | 345/163 |
| 2009/0222113 A1* | 9/2009 | Fuller et al. | 700/83 |
| 2009/0322680 A1* | 12/2009 | Festa | 345/160 |
| 2010/0023314 A1* | 1/2010 | Hernandez-Rebollar | 704/3 |
| 2010/0045619 A1* | 2/2010 | Birnbaum et al. | 345/173 |
| 2010/0105479 A1* | 4/2010 | Wilson et al. | 463/37 |
| 2010/0105480 A1* | 4/2010 | Mikhailov et al. | 463/38 |
| 2010/0113153 A1* | 5/2010 | Yen et al. | 463/37 |
| 2010/0124949 A1* | 5/2010 | Demuynck et al. | 455/569.1 |
| 2010/0171887 A1* | 7/2010 | Meng et al. | 348/734 |
| 2010/0214243 A1* | 8/2010 | Birnbaum et al. | 345/173 |
| 2010/0234182 A1* | 9/2010 | Hoffman et al. | 482/8 |
| 2010/0304868 A1* | 12/2010 | Zalewski | 463/38 |
| 2011/0025596 A1* | 2/2011 | Dohta | 345/156 |
| 2011/0109545 A1* | 5/2011 | Touma et al. | 345/158 |
| 2011/0163944 A1* | 7/2011 | Bilbrey et al. | 345/156 |
| 2011/0199305 A1 | 8/2011 | Suh | |
| 2011/0205156 A1* | 8/2011 | Gomez et al. | 345/157 |

FOREIGN PATENT DOCUMENTS

| | | |
|---|---|---|
| KR | 20040066986 | 12/2004 |
| KR | 20050025837 | 1/2006 |

\* cited by examiner

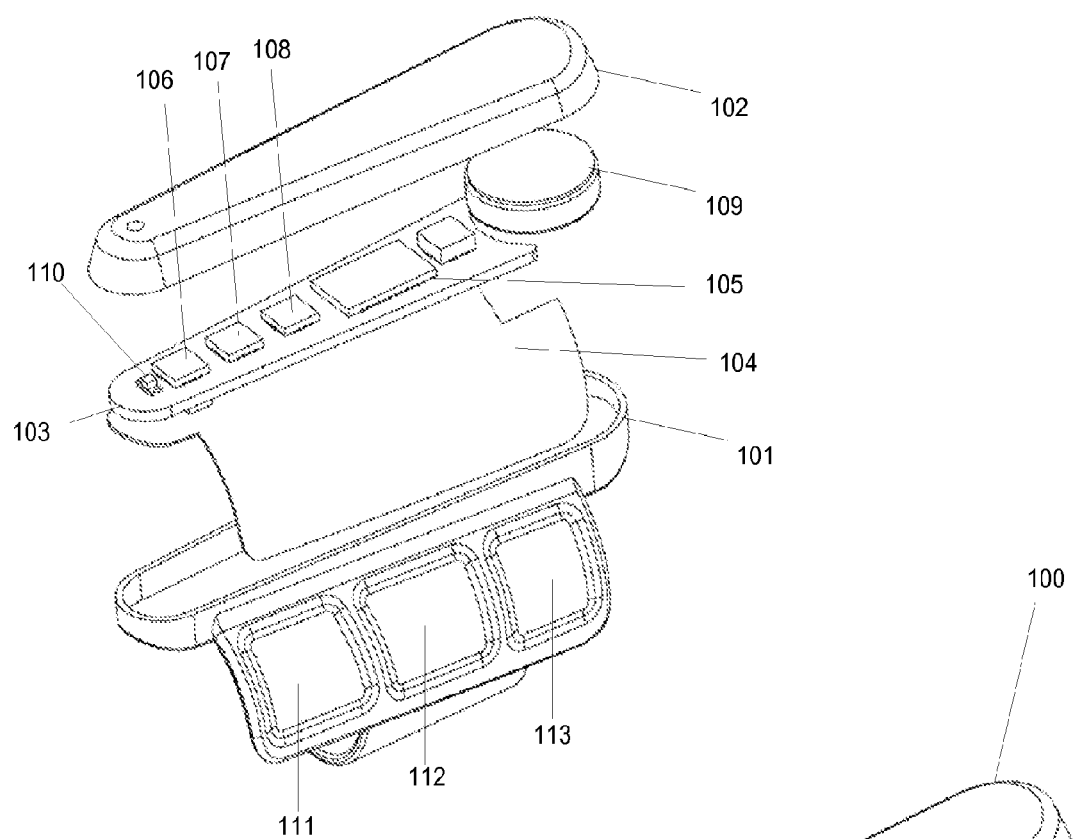
FIG. 1A
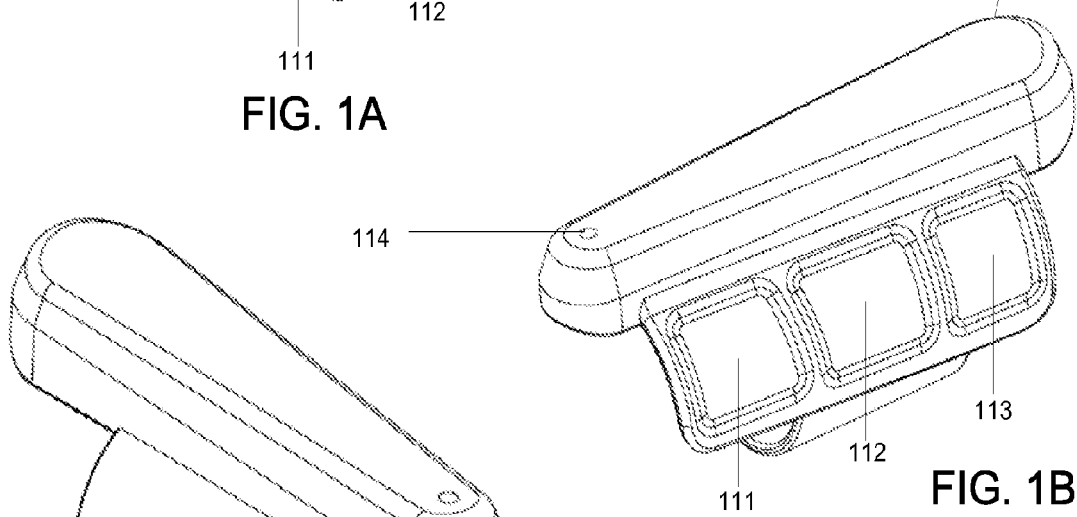
FIG. 1B
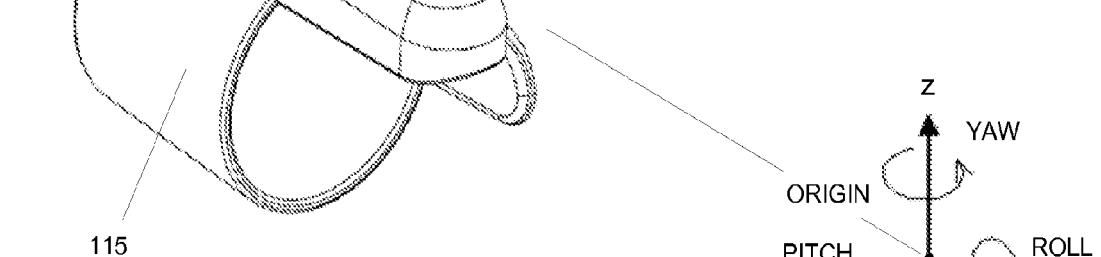
FIG. 1C
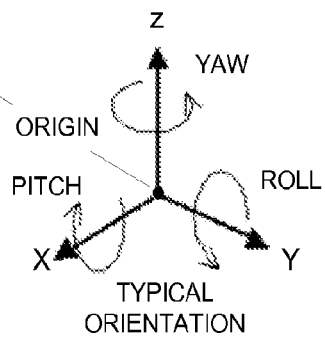

US 9,110,505 B2

WEARABLE MOTION SENSING COMPUTING INTERFACE

REFERENCE TO RELATED APPLICATIONS

This application claims priority to U.S. Provisional Application Ser. No. 61/324,824 entitled "User Interface and Computer Interface with Accelerometer, Gyroscope and Wireless Interface" filed Apr. 16, 2010, and to U.S. Provisional Application Ser. No. 61/346,974 entitled "Accelerometer-Based Computing Interface" filed May 21, 2010.

TECHNICAL FIELD

The devices, methods, and systems described below relate generally to the field of computing devices and more particularly to devices, methods and systems for human-computer interaction.

BRIEF DESCRIPTION OF THE DRAWINGS

FIG. 1A is an exploded perspective view of a finger mouse.
FIG. 1B is a perspective view of a finger mouse.
FIG. 1C is a perspective view of a finger mouse.

SUMMARY

Figure 1D:
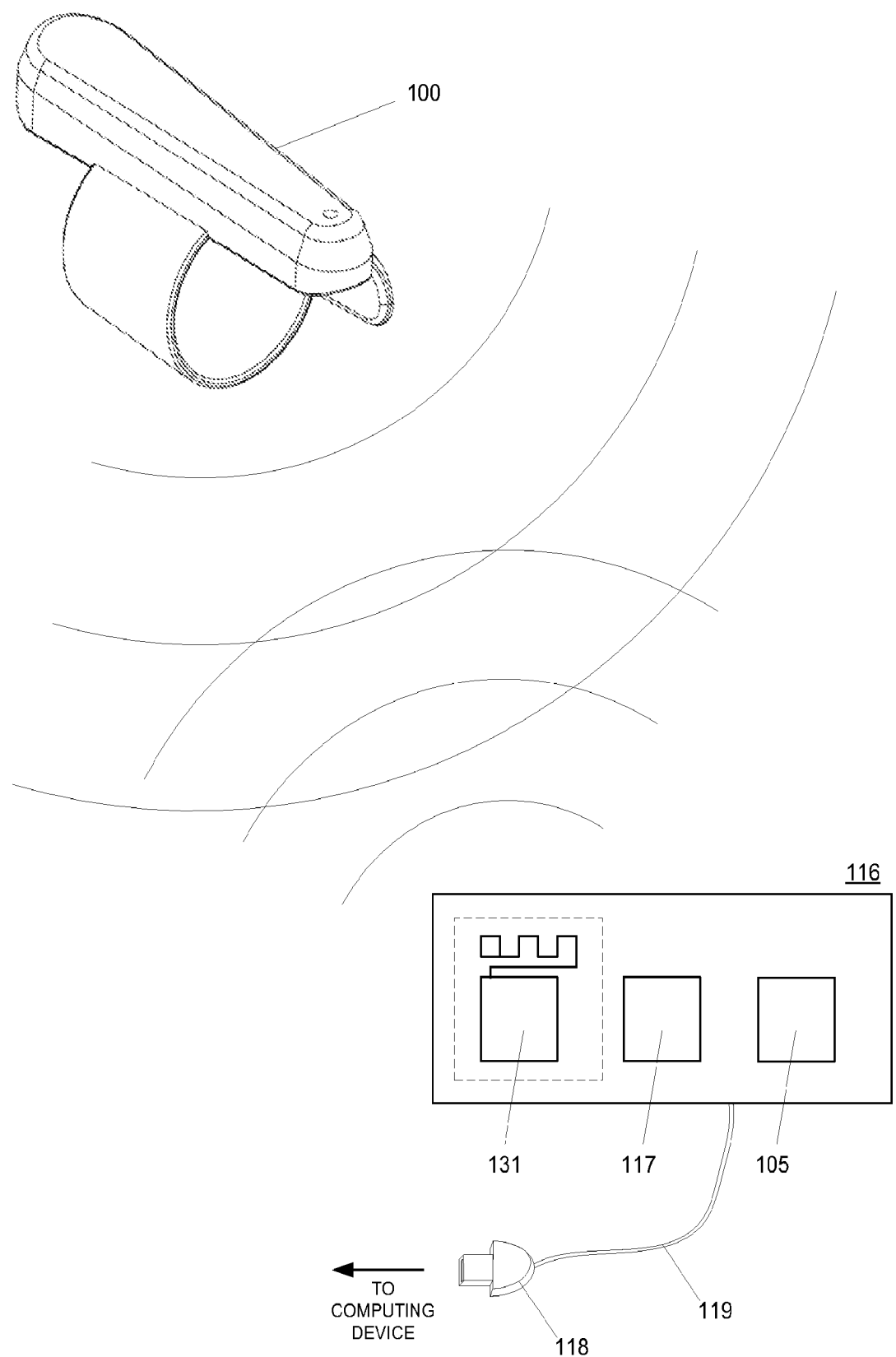
FIG. 1D is a perspective view of a finger mouse system.

An apparatus can comprise a sensor configured to detect movement and generate movement data related to at least part of the detected movement, a messaging unit configured to create a message that includes movement information based on the movement data, a transmitter in communication with the messaging unit that transmits the message, and a housing that encloses the sensor, messaging unit, and transmitter and that has a finger grip for secures the housing to a human finger. In configurations, the finger grip can be removable from the housing and can include a band. In configurations, the sensor can include an accelerometer, for example a three-axis accelerometer, and the movement information can include acceleration data from the accelerometer. In configurations, the sensor can include a gyroscope, for example a three-axis gyroscope, and the movement information can include rotational data from the gyroscope. In configurations, the message can include tap information from detection of a movement characteristic of a tap of a finger. In configurations, the apparatus can include a power source, for example a removable power source, a battery, a capacitor, or an external power source coupled to the apparatus, that supplies electrical energy to the transmitter and sensor. In configurations, the apparatus can include a touch sensor that has a touch surface for detecting touches that is in communication with the messaging unit. In configurations, the apparatus can include a slide sensor that has a touch surface for detecting touches that is in communication with the messaging unit. In configurations, the touch sensor and slide sensor are capacitive sensors. In configurations, the message includes touch data of the touch sensor and slide sensor.

In configurations, the apparatus further comprises an authentication unit that manages authentication data, and the message can include authentication data. In configurations, the messaging unit can be configured to request establishment of a communication channel with a remote device based upon activation of a touch sensor, and halt message creation based upon conditions such as the loss of the communication link, a reduction in detected movement, a detection of an activation sequence, an expiration of a timer, a detection of a low power condition, a detection of an error condition, and a receipt of a halt message. In configurations, the transmitter can use communication protocols such as Institute of Electrical and Electronics Engineers (IEEE) protocols, wireless protocols, IEEE 802.x protocols, Infrared Data Association (IrDA) protocols, parallel communication protocols, synchronous serial protocols, asynchronous serial protocols, universal serial bus (USB) protocols, the transmission control protocol/Internet protocol (TCP/IP) protocol, the user datagram protocol/Internet protocol (UDP/IP) protocol, and the IEEE 1394 protocol. The apparatus can comprise a vibrator that can be activated by a received message or a state condition of the apparatus. The apparatus can comprise a sound emitter that can emit an audible alert that can be activated by a received message or a state condition of the apparatus. The apparatus can comprise a visual indicator that can be activated by a state condition of the apparatus such as a power-on condition, a self-test condition, a movement, a transmission of a message, a receipt of a message, and the establishment of a communication channel.

An apparatus can comprise a receiver configured to receive a motion signal transmitted from a motion sensing device; a translation circuit configured to convert the motion signal into an input message compatible with an input interface of a computing device; and an output interface configured to send the input message to the input interface of the computing device. The apparatus can further comprise a transmitter configured to send a motion signal acknowledgement to the motion sensing device. The receiver can be further configured to request retransmission of the motion signal. The input message can be associated with an event selected from the group consisting of a mouse movement, a mouse click, a button-down event, a button-up event, a button click event, and a keyboard event. The receiver can be further configured to use a communications protocol selected from a group consisting of an Institute of Electrical and Electronics Engineers (IEEE) protocol, a wireless protocol, an IEEE 802.x protocol, an IEEE 802.15.4 protocol, an IEEE 802.16 protocol, an IEEE 802.11 protocol, an Infrared Data Association (IrDA) protocol, a parallel communication protocol, a synchronous serial protocol, an asynchronous serial protocol, a universal serial bus (USB) protocol, an Ethernet protocol, a TCP/IP protocol, a UDP/IP protocol, and an IEEE 1394 protocol. The output interface can be selected from a group consisting of a USB port, a serial port, an Ethernet port, a LAN port, a card socket, and a bus interface card, and a wireless interface.

A method can comprise generating movement data related to at least part of a movement detected by a sensor; creating, with a messaging unit, a message that can be configured to include movement information based at least in part upon the movement data; and transmitting the created message; wherein at least one of the sensor, the messaging unit, and the transmitter can be at least partially enclosed in a housing that can include a finger grip configured to secure the housing to a human finger. The finger grip can be removably connected to the housing and can include a band. The sensor can include an accelerometer. The movement information can include acceleration data of the accelerometer. The message can be configured to include tap information based at least in part upon detection of movement that can be characteristic of a tap of a finger. The accelerometer can be a three-axis accelerometer. The sensor can include a gyroscope. The movement information can further include rotational data of the gyroscope. The gyroscope can be a three-axis gyroscope.

The method can further comprise powering at least one of the transmitter and the sensor by supplying electrical energy from a power source. The power source can be a source selected from the group consisting of a battery, a capacitor, and an external power source. The power source can be removably connected.

The method can further comprise generating touch data associated with a touch on a touch surface of a touch sensor that is in data communication with the messaging unit. The method can still further comprise generating touch data associated with a sliding touch on a touch surface of a slide sensor that is in data communication with the messaging unit. Each of the touch sensor and the slide sensor can be a capacitive sensor. The message can be configured to include touch data of the touch sensor and touch data of the slide sensor. The message can be configured to include a header and a device identifier.

The method can still further comprise requesting establishment of a communication channel with a remote device based at least in part upon activation of a touch sensor. The method can also further comprise activating a vibrator upon at least one of receiving a message and detecting a state condition. The method can also further comprise emitting an audible alert upon at least one of receipt of a message and detecting a state condition. The method can still further comprise activating a visual indicator based at least in part upon detection of a condition selected from the group consisting of a power-on condition, a self-test condition, movement, transmission of a message, receipt of a message, and establishment of a communication channel.

A method can comprise receiving data associated with at least a portion of a movement of a wearable motion sensing device; filtering the data to produce a rate of change of the movement of the wearable motion sensing device; integrating the rate of change of the movement to produce a measured movement of the wearable motion sensing device; summing the measured movement and an accumulated movement to produce at least one of an updated position of the wearable motion sensing device and an updated orientation of the wearable motion sensing device; and updating a feature of a user interface of a computing device based at least in part upon one of the updated position and the updated orientation. The data can be at least one-axis acceleration data from an accelerometer of the wearable motion sensing device. Alternatively, the data can be at least one-axis angular rate data from a gyroscope of the wearable motion sensing device. The method can further comprise scaling the data. The scaling can be performed by a scaling function selected from the group consisting of a linear scaling function, an exponential scaling function, a scaling function that scales according to the formula $A_i'=((4/32768)*A_i)*9.81$ where $A_i$ is an acceleration data for a single axis selected from the x, y, and z axes, and a scaling function that scales according to the formula $G_i'=((500 \text{ dps}/32786)*(pi/180))*G_i$ where $G_i$ is an angular rate data for a single axis selected from the x, y, and z axes.

The method can further comprise receiving an indication of a sensor activation of the wearable motion sensing device, and wherein the feature can be updated at least in part upon receiving the indication of the sensor activation. The feature of the user interface of the computing device can be a cursor position. The cursor position can be updated based at least in part upon a scaled measured movement. A change of the cursor position in a first axis can be produced by a movement in a second axis of the wearable motion sensing device. Further, the feature can be selected from the group consisting of a left button click, a right button click, an application defined button click, a user defined button click, a scrolling function, a zoom in function, a zoom out function, an opening of an application, a closing of an application, a checking of an email, an editing of a character, a typing of a character, a copying of a character, a deleting of a character, a pasting of a character, a selecting of a user-selectable option, a sending of an item to the recycle bin, a modifying of a volume level, a muting of a volume, a selecting of a multimedia item, a playing of a multimedia item, a pausing of a multimedia item playback, a changing of a speed of playback of a multimedia item, a rewinding of a playback of a multimedia item, a fast forwarding of a playback of the multimedia item, a skipping of a portion of playback of a multimedia item, a rotation of an image, a resizing of an image, a scaling of an image, a trimming of an image, an image processing of an image, and a movie editing function.

The method can further comprise filtering that can be performed by a filter selected from a group consisting of smoothing filter, a high pass filter, a Kalman filter or an iterative algorithm. The filtering further can comprise selecting a plurality of data points from the data, calculating a mean of the selected plurality of data points, calculating a standard deviation of the selected plurality of data points, comparing the standard deviation with a minimum standard deviation, and subtracting the mean from a data point, when the standard deviation is less than the minimum standard deviation; to remove a DC offset from the data point and to produce the rate of change of the movement of the wearable motion sensing device. The minimum standard deviation can be 0.03 for data associated with an axis of acceleration, and wherein the minimum standard deviation is 0.003 for data associated with an axis of angular rate. The operation of selecting a plurality of data points is performed by applying a window function to the data to select about 50 data points. The method can further comprise determining an orientation of the wearable motion sensing device using a measurement of acceleration due to gravity of the wearable motion sensing device.

DETAILED DESCRIPTION

The devices, methods, and systems disclosed and described in this document can be used to interface motion sensing devices with computing devices. For ease of description, the examples included in this document focus on wearable motion sensing devices and communication methodologies and protocol stacks that can be used to interface with a user interface of a computing device. Those of ordinary skill in this art area will recognize from reading this description that the devices, methods, and systems described can be applied to, or easily modified for use with, other types of equipment, other protocols, and at other layers in a communication protocol stack. Descriptions of components presented solely as part of a direct communication link between the motion sensing devices and computing device do not imply that other architectures, such as network based architectures, could not be used. To the contrary, possible modifications will be apparent to people of ordinary skill in this area after reading disclosures in this document. Like reference numerals are intended to refer to the same or similar components.

Throughout this disclosure, references to components or modules generally refer to items that logically can be grouped together to perform a function or group of related functions. Components and modules can be implemented in software, hardware, or a combination of software and hardware. The term software is used expansively to include not only executable code, but also data structures, data stores and computing instructions in any electronic format, firmware, and embedded software. The term "information" is used expansively and includes a wide variety of electronic information, including but not limited to machine-executable or machine-interpretable instructions; content such as text, video data, and audio data, among others; and various codes or flags. The terms "information" and "content" are sometimes used interchangeably when permitted by context. It should be noted that although for clarity and to aid in understanding some examples discussed below might describe specific features or functions as part of a specific component or module, or as occurring at a specific layer of a computing device (for example, a hardware layer, operating system layer, or application layer), those features or functions may be implemented as part of a different component or module or at a different layer.

The examples discussed below are examples only and are provided to assist in the explanation of the systems and methods described. None of the features or components shown in the drawings or discussed below should be taken as mandatory for any specific implementation of any of these systems or methods unless specifically designated as mandatory. For ease of reading and clarity, certain components, modules, or methods may be described solely in connection with a specific figure. Any failure to specifically describe a combination or subcombination of components should not be understood as an indication that any combination or subcombination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented may be performed in a different order or in parallel.

Computing systems typically have a user interface to allow a person to either access or enter data within a computing device. Computing devices can be desktop computers, laptops, tablets, smartphones, gaming systems, kiosk systems, devices with embedded processors, automotive systems, music playing devices, and generally any kind of system or device that employs processing logic where human input is utilized to control a function of the system or device. Most common user interface data entry devices used in conjunction with computing systems are the keyboard, which allows a user to enter data either as text or numerical information, and the mouse, which refers to a type of user interface in which a computer operator can manipulate a cursor in a 2D plan video graphic screen such as the video screen 402 of a computer 400. The traditional mouse is also used as a navigation tool to select points of data entry and other related functions on the video graphic screen. As disclosed herein, the finger mouse 100 provides fewer restrictions to the user or computer operator as with use of a conventional mouse. Those of ordinarily skilled in the art area will recognize from reading the description that the device, methods, and systems described herein can be applied to, or easily modified for use with, other types of equipment. Like reference numbers are intended to refer to the same or similar items.

Referring now to FIGS. 1A, 1B, and 1C, views of a finger mouse 100 are presented. The finger mouse 100 is a motion sensing device that can interface with a computing device and facilitate human-computer interaction. The finger mouse 100 can comprise a bottom housing 101, a top housing 102, a rigid circuit board 103 comprising a RF transceiver 105, an accelerometer 106 of at least one axis, a gyroscope 107 functional in at least three axis (pitch, yaw, roll), a capacitive sensing circuit 108 that can sense areas including buttons, a slide bar, or both, a battery 109, and a visual indicator 110, for example a Light Emitting Diode (LED) and a flexible circuit 104 that can comprise capacitive sense buttons 111, 112, 113 or touch sensors, a slide bar, or tactile buttons.

In configurations, the rigid circuit board 103 can be flexible, or can comprise two or more separate circuit boards. In other configurations, the rigid circuit board 103 and flexible circuit 104 can be a single flexible circuit. In still other configurations, the RF transceiver 105, accelerometer 106, gyroscope 107, capacitive circuit 108, battery 109, visual indicator 110, and flexible circuit 104 can be separate from the rigid circuit board 103 and electrically connected via a bus or wires (not shown). In alternative configurations, the finger mouse 100 may comprise only a subset of the listed components. For example, the gyroscope 107 can have less than three axes or the rigid circuit board 103 may not include a visual indicator 110.

In alternative configurations, the individual components can be combined or separated as would be understood by one familiar with the art. For example, the accelerometer 106 and gyroscope 107 can be a single component or chip, or each axis of the accelerometer 106 and gyroscope 107 can comprise a separate discrete component. In another example configuration, the housing 101, 102 can be a single molded unit that provides a protective recessing by surrounding all of, or a portion of, the internal electronics, using for example molded silicon, plastic, rubber, other compounds, or combinations thereof. In a configuration, the housing 101, 102, can include a band 115 or removable finger grip 125 and can be a single unit of material, for example a molded silicon or rubber unit, with the rigid circuit board 103 and flexible circuit 104 embedded within the material.

In configurations, the finger mouse 100 can include a pulse oximeter to measure heart rate 155 which can include a separate sensor mounted in the housing 101, 102, 115, 125, a global positioning system (GPS) 156 circuit, radio frequency identification (RFID) chips 154, camera (not shown), charge coupled devices, focal plane arrays or linear sensor arrays sensitive to various frequencies of electromagnetic radiation (not shown), altimeters (not shown), and magnetometers (not shown) as additional sensors to develop a more comprehensive set of data for understanding the movement, position, and state of the user who is utilizing the finger mouse 100. With additional sensors inputs, the finger mouse 100 can develop a more complete, comprehensive event analysis of the user's experience with the finger mouse 100.

A power source in the finger mouse 100 can be a battery 109. The battery 109 can be a coin-type battery of the type commonly used to power small electronic devices. A conductive retaining clip (not shown) can be used to both releasably attach the battery 109 to the device and to complete a power circuit that includes the battery 109 as the power source. This releasable construction can be used to permit removal of the battery 109 for replacement or recharging, among other things. The finger mouse 100 incorporates a charging circuit (not shown) either directly connected by cable or wires to an external power source (not shown) or connected to an external power source through inductive coupling. The finger mouse 100 can be powered by an external power source (not shown) operatively coupled with the finger mouse 100. For example, the finger mouse 100 can be powered by a computer 400 through a USB port 130; the computer 400 would be the external power source. Those of ordinary skill in this area will recognize from reading this disclosure that other types of batteries and power sources (such as a solar cell or a super-capacitor) may be used in different configurations as desired, needed, or appropriate.

An indicator window 114 can be located on the exterior of the finger mouse 100, and can expose the LED or visual indicator 110, which can indicate multiple functions, actions, and conditions of the finger mouse 100, for example a power on condition, a self-test condition, and a sleep mode condition. Mouse selections from the user's thumb, or another finger, can result in certain kinds of flashing of LED or visual indicator 110. Movement of the finger while in cursor mode or scrolling mode can cause another type of flashing. Another flashing could be an indication of active communications between the finger mouse 100 and another computing device, for example establishment of a communications link or sending and receiving messages from a computing device. The finger mouse 100 can also have a vibratory component 152 and a sound emitter component 153 (see FIG. 1I.) These components can be programmed to interact in correspondence to actions as portrayed on a visual feedback device (not shown), for example by receiving a message from a computing device. For example, a cursor indicator on a video screen 402 moving and hitting an edge of the video graphic screen may be linked to the vibratory component 152 vibrating. The use of tactile sensations can serve the user to indicate cursor placement, or in another configuration tactile feedback can enhance a video game player's experience. In other configurations, auditory cues from the sound emitter can be similarly interactive, or can be based on an internal condition of the finger mouse 100, for example a power on or power off condition.

Communications operably couple the finger mouse 100 to a computing device. The communications can include wired and wireless communications. Data, which can include packetized data, messages, and signals, from the finger mouse 100 can be transmitted using a wired data transmission pathway including specific implementations or versions of universal serial bus ("USB"), Ethernet, or IEEE 1394 ("FireWire™" or "iLink™"), among others. Data from the finger mouse 100 can be transmitted using wireless data transmission or reception components. The wireless data transmission or reception components can operate according to a specified communication protocol. Suitable protocols include those in the Institute of Electrical and Electronics Engineers ("IEEE") 802-series such as ZigBee™ (IEEE 802.15.4), Bluetooth™ (IEEE 802.16) and WiFi™ (IEEE 802.11), among others.

Figure 14:
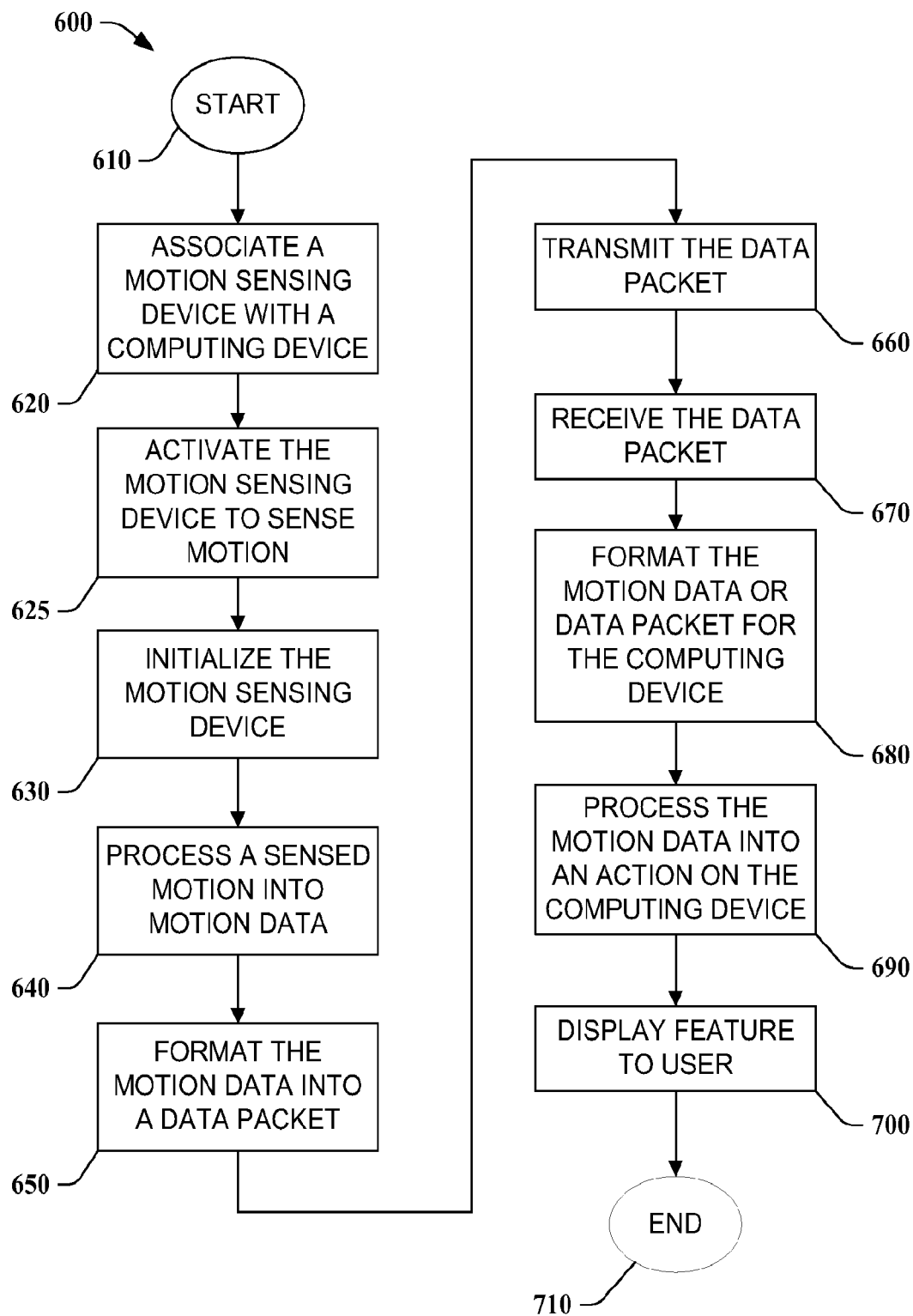
FIG. 14 is a flowchart of a method of interfacing a finger mouse with a computing device.

Referring now to FIG. 14, a flow diagram depicting a method of interfacing 600 a finger mouse 100 with a computing device is presented. Execution of the method begins at START block 610. At process block 620, the finger mouse 100 is associated with a computing device. Processing continues to process block 625 where the finger mouse 100 is activated to sense motion. Processing continues to process block 630 where finger mouse 100 is initialized. Processing continues to process block 640 where the sensed motion is processed into motion data. Processing continues to process block 650 where the motion data is formatted into a data packet or message. Processing then continues to process block 660 where the data packet or message is transmitted to a receiver. Processing then continues to process block 670 where the data packet or message is received by the receiver. Processing then continues to process block 680 where the data packet or message is formatted into motion data for the computing device. Processing then continues to process block 690 where the motion data is processed into an action for, or event on, the computing device. Processing then continues to processing block 700 a feature of a user interface of the computing device is updated. Processing then terminates at END block 710.

Figure 15A:
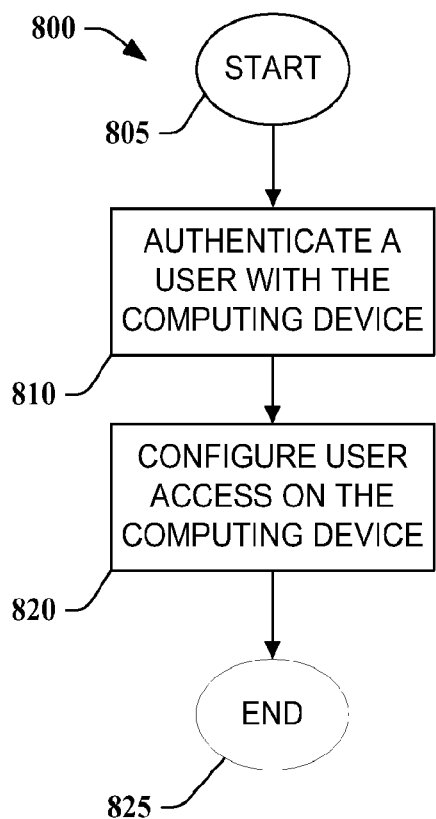
FIG. 15A is a flowchart of a method of interfacing a finger mouse with a computing device.

Referring now to FIG. 15A, a flow diagram depicting a method of authenticating 800 a user with a finger mouse 100 is presented. Execution of the method begins at START block 805. Processing continues to process block 810 where the user is authenticated with the computing device. Processing continues to process block 820 where access to the computing device is configured. Processing then terminates at END block 825. The method of authenticating 800 a user with a finger mouse 100 can be part of process block 620 of FIG. 14 where a finger mouse 100 is associated with a computing device.

Figure 15B:
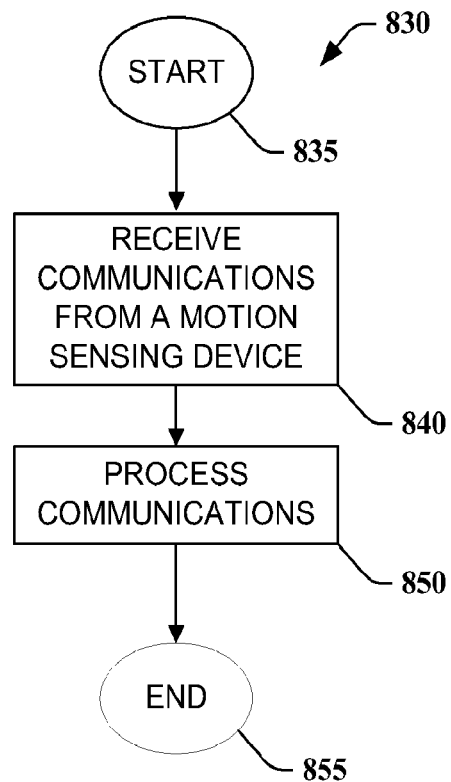
FIG. 15B is a flowchart of a method of interfacing a finger mouse with a computing device.

Referring now to FIG. 15B, a flow diagram depicting a method of receiving motion data 830 by a first finger mouse 100 from second finger mouse 100 is presented. Execution of the method begins at START block 835. Processing continues to process block 840 where the first finger mouse 100 receives motion data from a second finger mouse 100. Processing continues to process block 840 where the first finger mouse 100 processes the motion data from the second finger mouse 100 to create a new data packet or new message. Processing then terminates at END block 845. The method of receiving motion data 830 from a second finger mouse 100 can be part of process block 640 of FIG. 14 where a finger mouse 100 processes motion data.

Figure 15C:
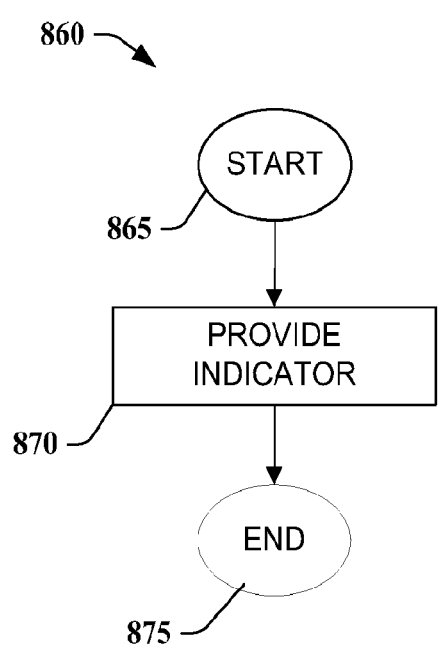
FIG. 15C is a flowchart of a method of interfacing a finger mouse with a computing device.

Referring now to FIG. 15C, a flow diagram depicting a method of providing an indication 850 is presented. Execution of the method begins at START block 855. Processing continues to process block 860 where the finger mouse 100 presents an indication to the user, for example a visual indication, an audible indication, a vibratory indication or any other kind of indication. Processing then terminates at END block 865. The method of providing an indication 850 can be part of process blocks 620, 625, 630, 660, 670 or any other process block where the user can receive information that a particular event has occurred or to provide status about an internal state of the finger mouse 100.

Figure 15D:
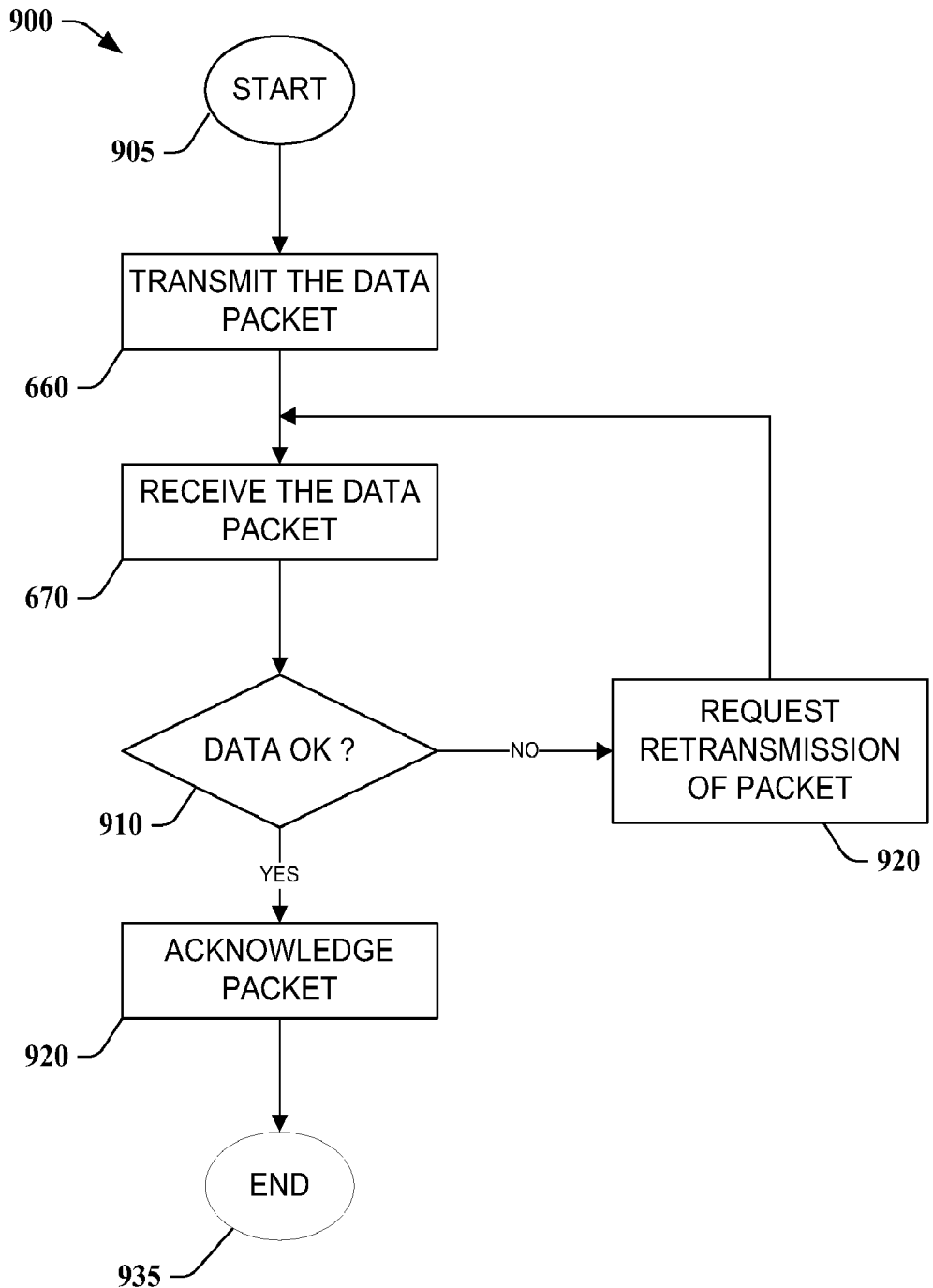
FIG. 15D is a flowchart of a method of interfacing a finger mouse with a computing device.

Referring now to FIG. 15D, a flow diagram depicting a method of data transfer 900 is presented. Execution of the method begins at START block 905. Processing continues to process block 660 where the data packet or message is transmitted to a receiver. Processing then continues to process block 670 where the data packet or message is received by the receiver. Processing then continues to decision block 910 where a determination is made whether the data packet or message is a valid data packet or message or is the next expected data packet or message if sequencing information is utilized. If the determination is NO, then processing continues to process block 930 where the receiver requests retransmission of the data packet or message. Processing then continues back to process block 670. If the determination is YES, then processing continues to process block 920 where receipt of the data packet or message is acknowledged back to the finger mouse 100 and processing then terminates at END block 935. The method of data transfer 900 can be part of process blocks 660, and 670 of FIG. 14 where a finger mouse 100 is transmitting and receiving data with a computing device.

Continuing to refer to FIGS. 1A, 1B, and 1C, and now also referring to FIGS. 14, 15A, 15B, 15C, and 15D, example methods of interfacing 600 a finger mouse 100 with a computing device are presented. The finger mouse 100 can be associated 620 with a computing device by activating 625 the finger mouse 100 near a computing device. In a configuration, the finger mouse 100 can be associated 620 with the computing system by activating 625 the finger mouse 100 and obtaining a network address from the computing device, for example by using a dynamic host control protocol (DHCP.) The finger mouse 100 can be associated 620 with the computing system by attaching to a USB port of the computing device and passing configuration information with the computing device. In a configuration, the finger mouse 100 can require an authentication method 800. For example, if the finger mouse 100 and the computing device use Bluetooth™, an initial pairing procedure takes place that associates 620 the Bluetooth™ interface in the finger mouse 100 with the receiving device. In a configuration, the finger mouse 100 can also authenticate 810 the user with the computing device, for example by identifying the particular finger mouse 100 from a device identification number of the finger mouse 100 that was previously associated with a particular user, or by a sequence of movements or sensor activations of the finger mouse 100 by the user. The authentication method 800 can also use digital certificates, encryption methods, or other authentication methods known in the art. Once authenticated 810, the computing device can configure 820 the appropriate user access to files, applications, and system resources for that user on the computing device.

Figure 1E:
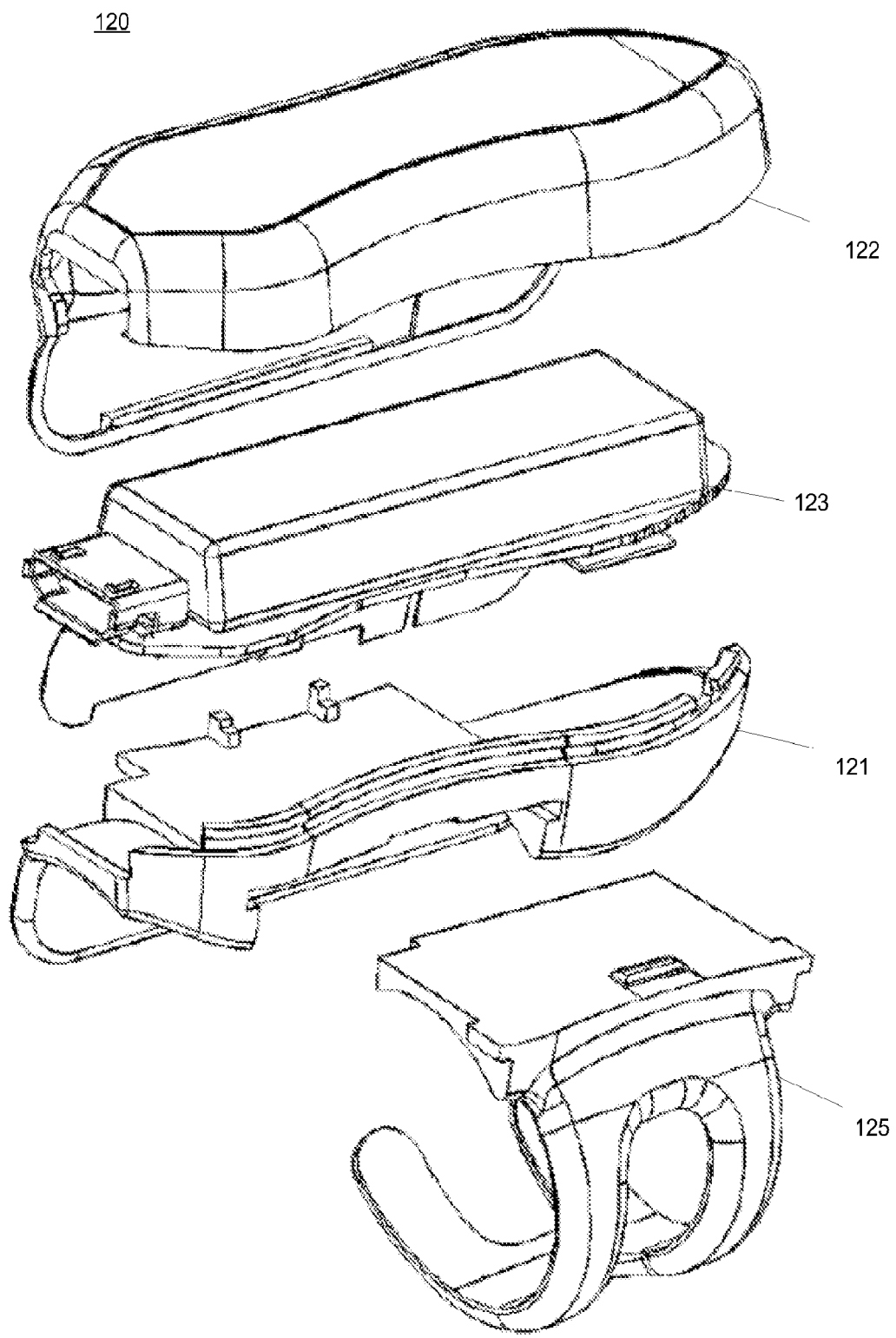
FIG. 1E is an exploded view of an ergonomic finger mouse.
Figure 1F:
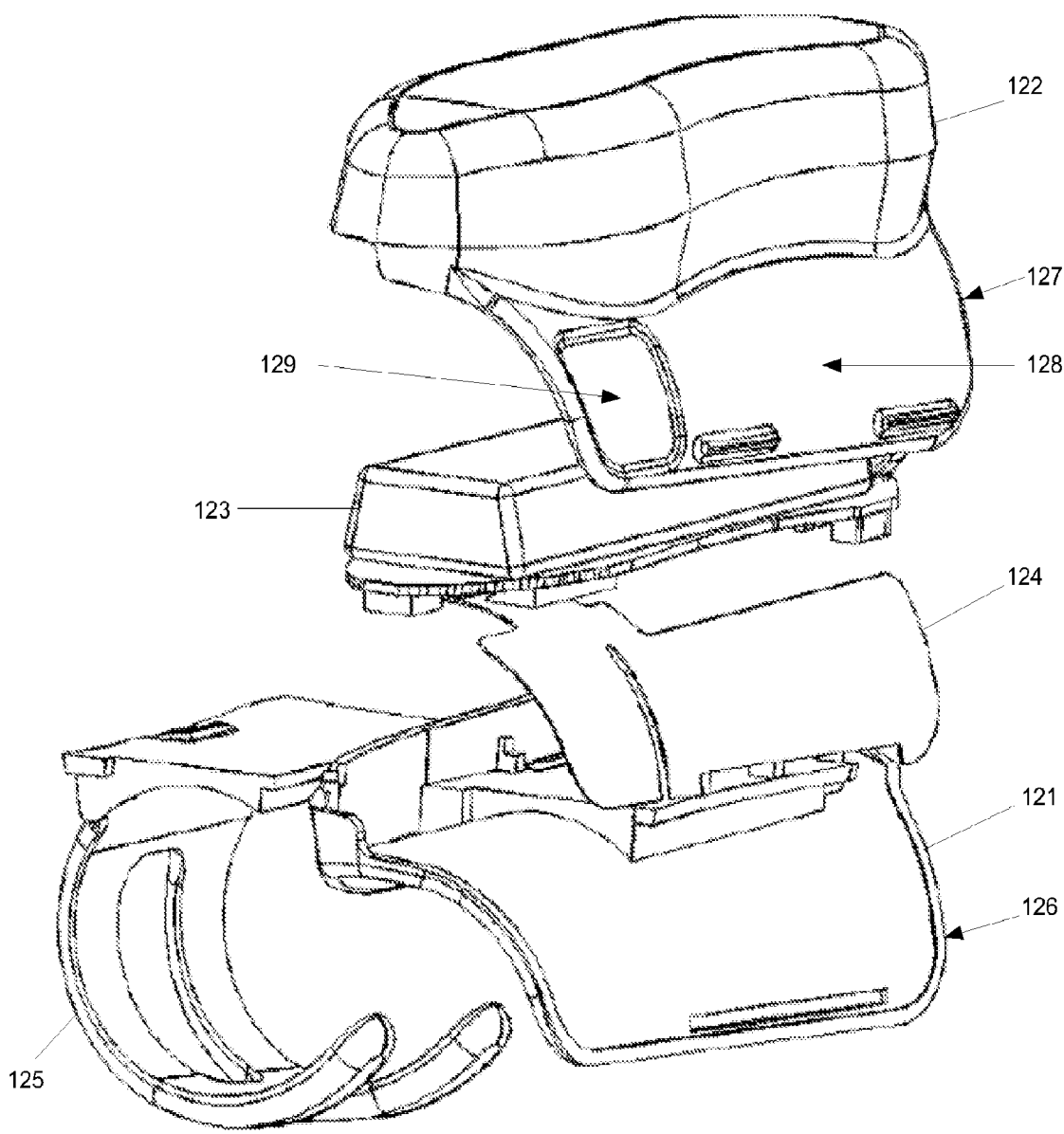
FIG. 1F is an exploded view of an ergonomic finger mouse.
Figure 1G:
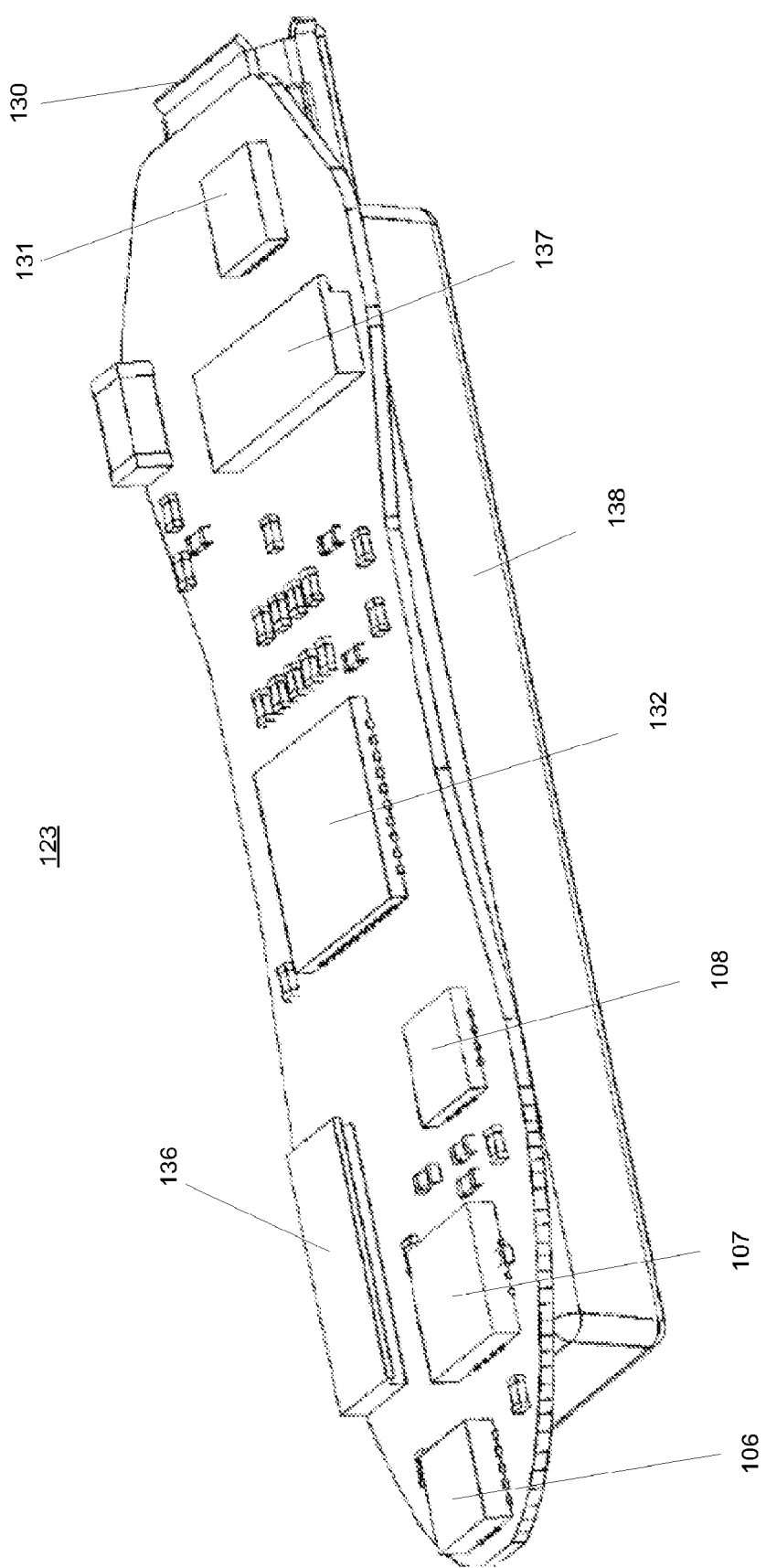
FIG. 1G is a perspective view of a finger mouse circuit board.
Figure 1H:
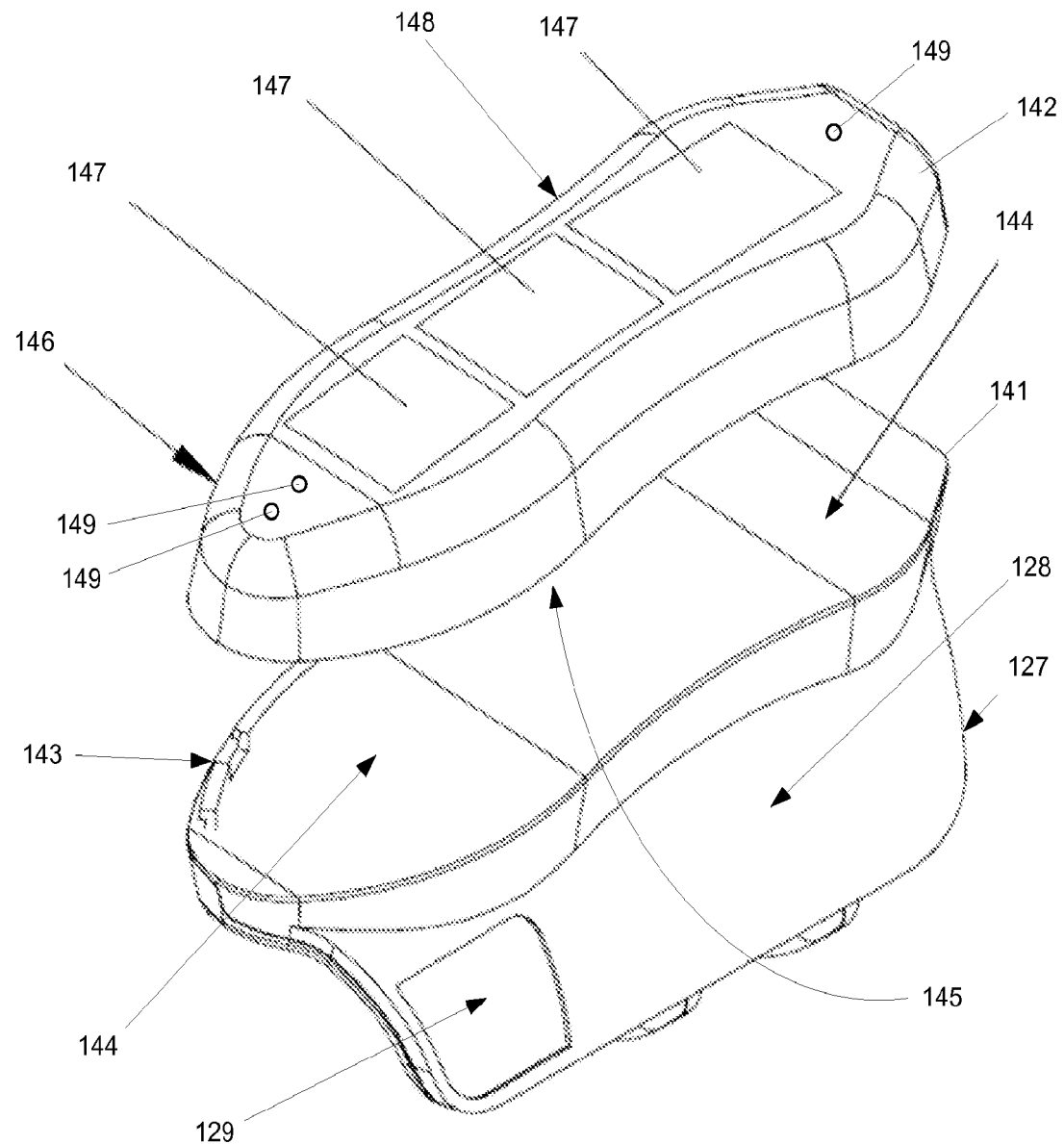
FIG. 1H is a partially exploded view of a finger mouse with a removable power module.
Figure 1I:
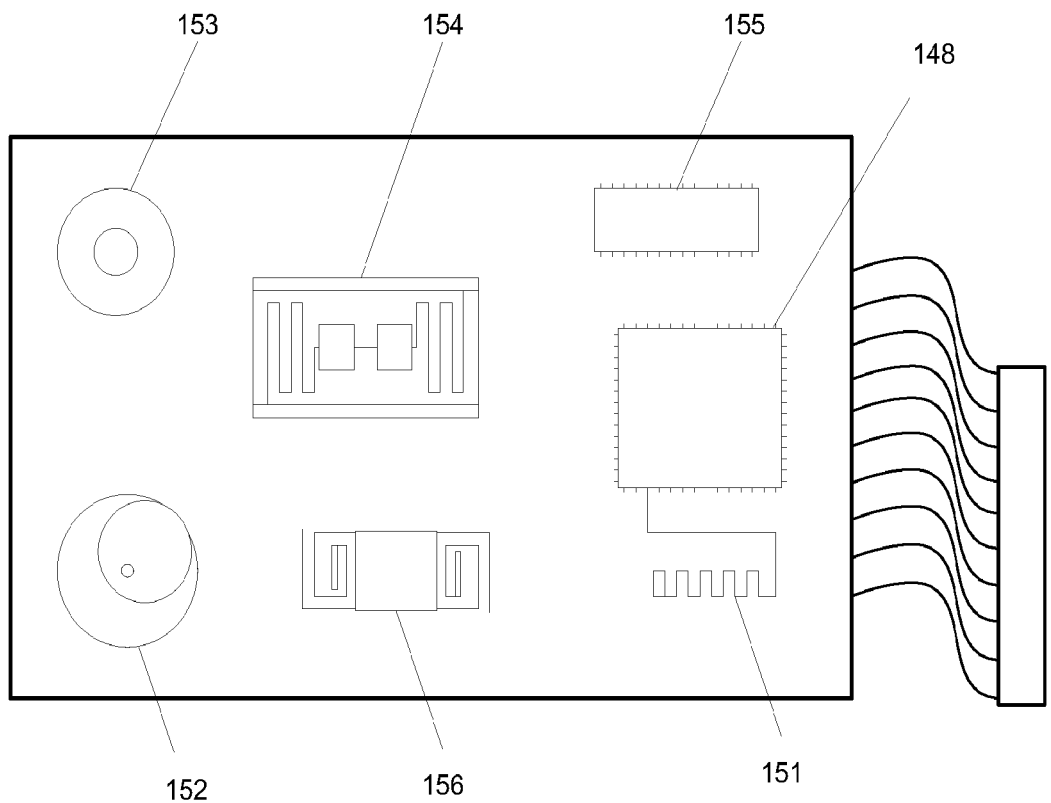
FIG. 1I is a plan view of a daughter board for a finger mouse.

Referring now also to FIG. 1I, in a configuration an RFID 154 chip in the finger mouse 100 can provide identification and authentication information for the finger mouse 100. The computing device can interrogate the RFID 154 chip directly, or the interrogation can be performed by another device and provided to the computing device though a network. For example, a user entering a room can be identified by an RFID reader that can be located for example in the doorframe. The RFID 154 chip in the finger mouse 100, or a separate RFID device associated with the user, provides authentication and identification information about the user and finger mouse 100. The information can be authenticated 800 by an authentication system that enables use of the finger mouse 100 with the computing device.

The finger mouse 100 processes 640 the sensed motion into motion data, formats 650 the motion data into a message structure suitable for the wired or wireless communications protocol being utilized, for example a data packet, and transmits 660 the message to a receiver, such as a computing device. The receiver receives 670 the message, and can acknowledge 920 the message, if a suitable protocol is being used, and can request retransmission 930 of packets if message sequencing information is supported by the protocol or if the finger mouse 100 determines that the message is corrupt. If the receiver is not the computing device, but is, for example, a dongle or wireless adaptor, then the receiver can further process the message, for example by formatting 680, reformatting, or converting the message into a protocol suitable for the computing device. In a non-limiting the example, a finger mouse 100 can wirelessly communicate with a dongle using the ZigBee™ protocol, and the dongle can communicate with the computing device using a USB port. The motion data in the message can be processed 690 and turned into an action, event, or command for the computing device, for example a movement of a cursor on the computing device that is displayed 700 to the user.

If the finger mouse 100 is utilizing a wireless networking protocol, the finger mouse 100 can form an ad-hoc network with another finger mouse 100 and route messages to the receiver, for example if multiple finger mice 100 are simultaneously used by the user. In a configuration, the finger mouse 100 can also receive 840 messages from other finger mice 100 and process 850 new messages that are sent to the computing device. This advantageously requires the user to only have to authenticate a first finger mouse 100 with the computing system instead of having to individually authenticate 810 one or more finger mice 100 with the computing system. In a configuration, the finger mouse 100 can receive messages from other finger mice 100 and process 850 the messages to create new messages based on a combination of the data from one or more finger mice 100, thereby facilitating control of the user interface of the computing device based upon combinations of movements of multiple finger mice 100.

In a configuration, the finger mouse 100 uses a transmission control protocol over internet protocol (TCP/IP.) In a configuration, the finger mouse 100 uses a user datagram protocol over internet protocol (UDP/IP.) In a configuration, the finger mouse 100 uses a lightweight protocol adapted for low power wireless transmission.

In a non-limiting example, the finger mouse 100 can use a wireless communication protocol such as the SimpliciTI™ protocol from Texas Instruments, or another suitable protocol. The finger mouse 100 can transmit data to a receiver 116 or computing device at a data transmission rate of 250 Hz. In a non-limiting example, the data packet can comprise the following elements:

0xAA, (unsigned Byte [8 bit integer] (0-255))
0x55, (unsigned Byte [8 bit integer] (0-255))
0x12, (unsigned Byte [8 bit integer] (0-255))
Peer #, (unsigned Byte [8 bit integer] (0-255))
Transaction I.D., (unsigned word [16 bit integer] (0-65535))
Capsense Data Byte, (unsigned Byte [8 bit integer] (0-255))
Capsense Data Byte 2, (unsigned Byte [8 bit integer] (0-255))
Ax, (word [16 bit integer] (−32768 to 32768))
Ay, (word [16 bit integer] (−32768 to 32768))
Az, (word [16 bit integer] (−32768 to 32768))
Gx, (word [16 bit integer] (−32768 to 32768))
Gy, (word [16 bit integer] (−32768 to 32768))
Gz, (word [16 bit integer] (−32768 to 32768))

The first three bytes of data (0xAA, 0x55, 0x12) can be the start bytes for verifying the start of a packet. The peer # byte can be used for collaboration of multiple finger mice 100. The transaction I.D. can contain a sequence number of the packet being transmitted, and can be used for windowing functions or proper sequencing of the data packets. The capsense data byte can contain cursor button activation, slide activation, and centroid position information. For example bit 0 can be always 1; bit 1 can be for activation of a button 111 or touch sensor area 129; bit 2 can indicate button 112, 113 or slide sensor area 128 activation, and bits 3-7 can be for button 112, 113 activation or centroid position in the slide sensor area 128. The centroid position indicates where a user's finger is placed within the slide sensor area 128. The capsense data byte 2 can contain charging status and link status information. For example bit 0 can be a debug bit; bit 1-5 can be reserved for future use, for example additional touch sensors; bit 6 can be for link status; and bit 7 can be for charge status, for example if the finger mouse 100 is charging through the USB port 130.

In an example operation, when a user touches the button 111 or touch sensor area 129, the finger mouse 100 wakes, sets bit 1 of the capsense data byte to high, and begins sending acceleration data, Ax, Ay, Az, and angular rate data Gx, Gy, Gz to the computing device. When the button 111 or touch sensor area 129 is touched, the finger mouse 100 can also perform an initializing 630 or zeroing of the acceleration data, Ax, Ay, Az, and angular rate data Gx, Gy, Gz to remove any drift or bias. The data can be converted by the finger mouse 100, receiver 116 or device driver into a cursor movement on the computing device displayed 700 to the user that tracks the movement of the finger mouse 100.

In a configuration, the finger mouse 100 can send motion data to the computing device only when button 111 or touch sensor area 129 is touched, which functions as an activation sequence. An activation sequence can be configured to be any kind of action by the user or computing device to instruct the finger mouse 100 to send motion data to the computing device, such as a powering on of the finger mouse 100, a user initiated activation of a button 111 or touch sensor 129 of the finger mouse 100, a user initiated activation of a slide sensor area 128 of the finger mouse 100, a user initiated movement of the finger mouse 100, and a receiving of a signal from a computing device. When the user stops touching the button 111 or touch sensor area 129, the finger mouse 100 can halt sending messages to the computer device. The finger mouse 100 can also halt sending messages based on loss of a communications link with the receiver 116, a reduction in movement of the finger mouse 100, a second activation sequence, an expiration of a timer after an activation of the activation sequence, a low battery power condition, an error condition of the finger mouse 100, and a receiving of a signal from the computing device.

When the user touches other sensing areas, for example the other buttons 112, 113 or slide sensor area 128, bit 2 of the capsense byte goes high. Short taps of a finger or thumb, collectively digits or fingers, to the slide sensor area 128 can indicate left, center, and right clicks, depending upon the Centroid Position Data (CPD): for example, (6>=CPD<=9) for a left mouse click, (13>=CPD<=16) for a middle mouse click, and (22>=CPD<=26) for a right mouse click. Activating the slide sensor area 128 for a user-configurable time can disable cursor movement and indicate left and right drag actions. Zoom and scroll capabilities can be controlled by detecting changes in CPD. A quick swipe of the user's finger over the slide sensor area 128 causes rapid increases or decreases in CPD values. If changes in CPD occur over a short time period then zoom or scroll function is active depending on the state of the cursor and the application running on the computing device.

The acceleration data, Ax, Ay, Az, and angular rate data Gx, Gy, Gz, data can be sent as raw data or processed data. Software, for example an algorithm 300 on the finger mouse 100, receiver 116, or a device driver on the computing device, can process 324 or convert the raw data into processed data that corresponds to a position value. What follows is a description of a non-limiting example of an algorithm 300 to convert the raw data into a position value.

Figure 12:
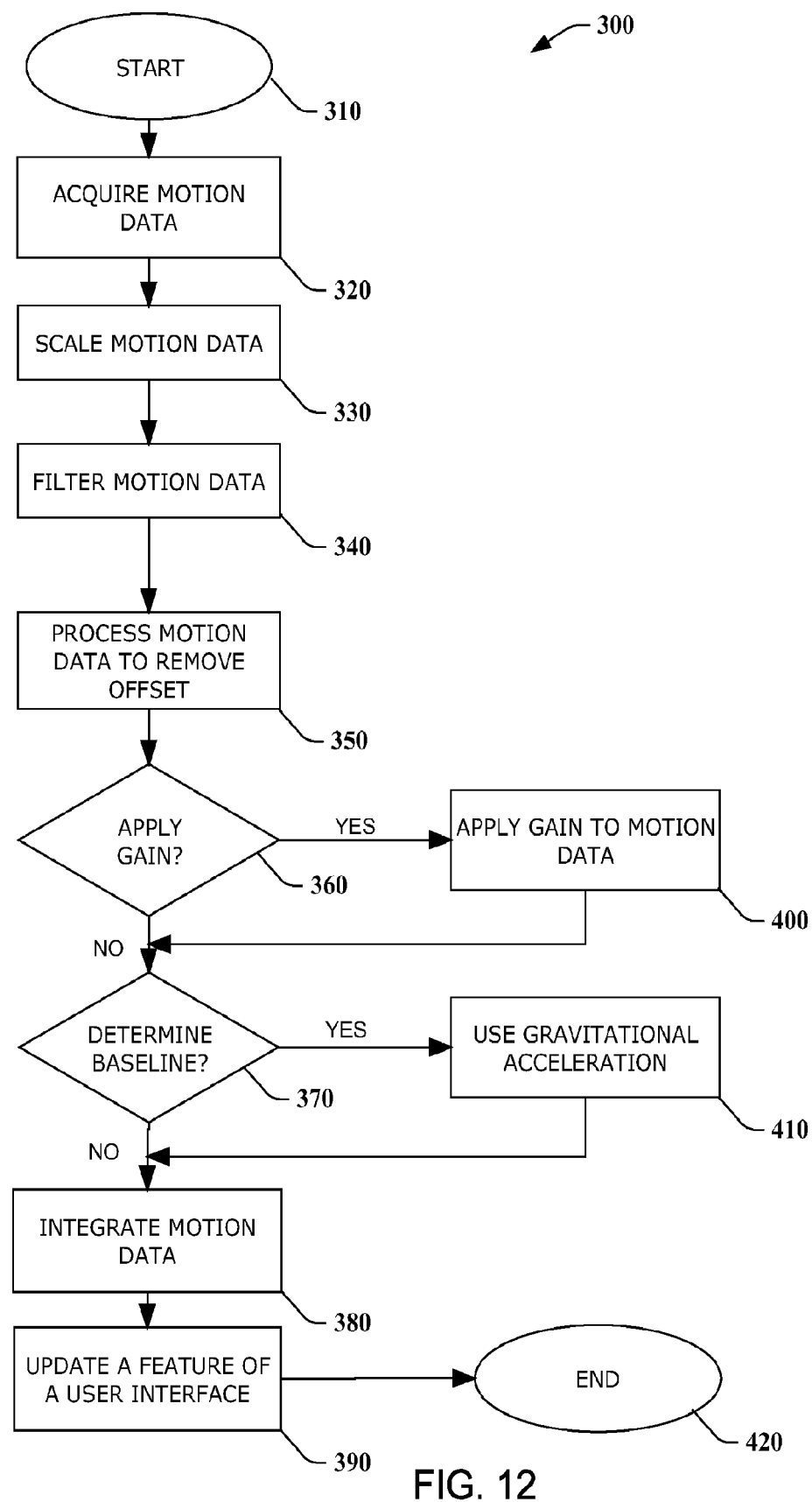
FIG. 12 is a flowchart of a method of processing motion data from a finger mouse.

FIG. 12 is a flow diagram depicting an algorithm 300 for controlling a finger mouse 100. Execution of the method begins at START block 310. At process block 320, the motion data is acquired. Processing continues to process block 330 where the motion data is scaled. Processing continues to process block 340 where the motion data is filtered. Processing continues to process block 350 where the motion data is processed to remove the DC offset. At decision block 360 a determination is made whether to apply a gain to the processed motion data. If that determination is YES, processing continues to processing block 400 where a gain is applied to the motion data and processing then continues to decision block 270. If the determination is NO, then processing continues to decision block 270. At decision block 270, a determination is made as to whether to determine the baseline orientation of the finger mouse 100. If that determination is YES, then processing continues to processing block 410 where acceleration of the finger mouse 100 due to gravity is used to determine the current orientation of the finger mouse 100 and processing then continues to processing block 380. If that determination is NO, then processing continues to processing block 380. At processing block 380, the processed motion data is integrated to obtain the accumulated position or angle data. Processing continues to processing block 390 where the accumulated position or angle data can be used to update a feature of a user interface of the computing device. Processing then terminates at END block 420.

Figure 13:
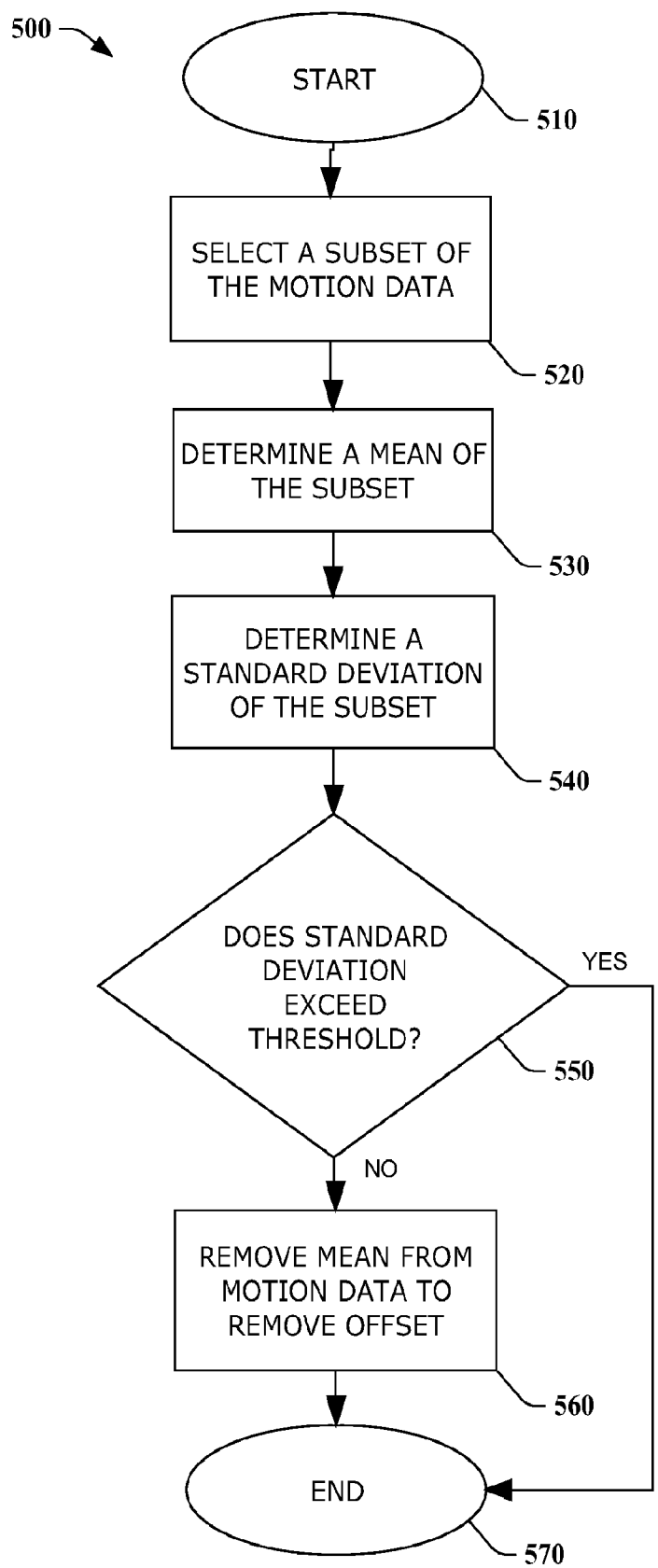
FIG. 13 is a flowchart of a method of processing motion data from a finger mouse.

FIG. 13 is a flow diagram depicting a fine control algorithm 500 for filtering and processing motion data to remove offset. The fine control algorithm 500 can be used in addition to, or instead of, the process blocks 340 and 350 of FIG. 12. Execution of the method begins at START block 510. At process block 520, a subset of the motion data is selected. Processing continues to process block 530 where a mean value of the subset of the motion data is determined. Processing continues to process block 540 where a standard deviation of the subset of the motion data is determined. Processing continues to decision block 550. At decision block 550 at determination is made whether the standard deviation of the subset of the motion data exceeds at threshold standard deviation. If the determination is YES, then the movement of the finger mouse 100 is too great for fine control and processing terminates at END block 570. If the determination is NO, then the finger mouse 100 is moving slowly enough for fine control and processing continues to process block 560. At process block 560, the mean value that was calculated at process block 530 is used to remove the offset from the motion data. Processing then terminates at END block 570.

In an example of the algorithm 300 for controlling a finger mouse 100 and the fine control algorithm 500, when a user activates the finger mouse 100, the finger mouse 100 determines the motion data and sends it to the device 100, 116 or computing device that is running the algorithm. Once the motion data is acquired 320 the motion data can be scaled 330. The raw acceleration data, Ax, Ay, Az, and angular rate data Gx, Gy, Gz can be converted or scaled 330 into usable units that correspond to real world values. For example, the acceleration data can be scaled 330 to a plus or minus 4 g scale, for example $A_i'$ (m/s^2)=((4 g/32768)*$A_i$)*9.81, where i=x, y, or z. The angular rate data can be scaled 330 to a plus or minus 500 degrees per second (dps) scale, for example $G_i'$ (radians/s)=((500 dps/32786)*(pi/180))*$G_i$, where i=x, y, or z.

The algorithm 300 can filter 340 the data, for example using smoothing functions or a moving average to remove transients that can cause large unwanted movements of the cursor on the user interface and inhibit fine control of the cursor on the user interface. The algorithm can also remove 350 the DC offsets, for example using a high pass filter to obtain only data representative of the change in motion of the finger mouse 100. For finer control, a Kalman filter or an iterative algorithm can be used, for example a fine control algorithm 500. For example, a subset of the data is selected 520 and a mean calculation of the value for each axis of acceleration and angular rate can be determined 530. The subset of the data can be selected 520 using a window function, and the mean can be determined 530 or calculated using only that subset of data points in the window. The window size can be adjustable and nominally is 50 data points. The standard deviation for each axis is calculated 540 and compared 550 against a minimum standard deviation. For acceleration, the minimum standard deviation can be adjustable and nominally is 0.03. For angular rate, the minimum standard deviation can be adjustable and nominally is 0.003. When the standard deviation for an axis is below the minimum standard deviation, the user's hand and the finger mouse 100 can be stable enough for the mean value for that axis to be subtracted from the data point, thus removing 560 the DC offset for each data point of the axis to produce data values representative of the true movement.

The algorithm 300 can also perform a baseline measurement to determine 370 the orientation of the finger mouse 100, for example using the acceleration of the finger mouse 100 due to gravity 410. The algorithm 300 can convert acceleration data to position data and convert angular rate to degrees of rotation to determine the position of the finger mouse 100 and the orientation of the finger mouse 100, for example, by performing a discrete integration 380 of the data values representative of the true movement with the accumulated position or angle data. The algorithm 300 can also re-orient the position data based on a change in angle. The algorithm 300 can apply 400 a gain to the data values representative of the true movement in order to control cursor acceleration; the gain can be selectable 360 and can be linear, or exponential, or any other function. The algorithm then outputs a position data in the desired form, for example an X, Y cursor position, or other form, to update 390 the cursor or any other feature of the user interface. The output position data could be in a Cartesian, or X, Y, Z coordinate system, or can be converted to a spherical-based coordinate system, or any other coordinate system as needed.

Referring again to FIG. 1C, a typical orientation of an acceleration orientation origin located at the tip of the finger mouse 100 is illustrated. Three dimensional frames of reference can be selected from a fixed reference plane or a floating reference plane in relation to the acceleration orientation origin. In an example of a fixed reference plane, acceleration of gravity and angular acceleration detected by the accelerometer 106 and a gyroscope 107 provide orientation of the finger mouse 100 in three dimensional spaces. Motion of the accelerometer 106 can be interpolated in a plane with respect to the finger tip. As shown in FIG. 1C, the directions of the various axis and 2D reference planes can be fixed to the finger mouse 100 itself. In this manner, if the ZX plane of the accelerometer 106 can be no longer perfectly vertical, the translation plane for pointer position can be interpolated based on the acceleration and the position feedback from the gyroscope 107. Such control can attribute the same execution of motion of the user's finger whether the finger mouse 100 is pointing straight out or pointed down.

The data from the finger mouse 100 can be processed 640 or converted into feature displayed 700 on a user interface, including keyboard keystrokes, mouse actions, or any other type of command used in human-machine user interfaces. The data from the finger mouse 100 that is processed 640 or converted into the feature can include one or more of the following: the motion of the finger mouse 100 in the form of raw acceleration data, Ax, Ay, Az, and angular rate data Gx, Gy, Gz, data, or processed position data, and the various activations of the various buttons 111, 112, 113, touch sensor areas 129, and slide sensor areas 128. The data that is processed 640 or converted can include individual data points, such as an individual sensor activation, or can include groupings of data. For example, a gesture from a user can be captured by the finger mouse 100 as a set of movements or several sets of movements. The sets of movements can be non-contiguous movements, for example an exclamation point can be processed by the finger mouse 100 from a rapid downward movement of the finger 100 to indicate a vertical line, followed within a short time interval by a forward movement of the finger mouse 100 to indicate a period under the vertical line.

The data from the finger mouse 100 can be processed or converted into common keyboard or mouse commands such as movement of a cursor, a left button click, a right button click, a scrolling function, the opening of an application, the closing of an application, and deleting an item or sending the item to the recycle bin. The data can also be processed or converted into an application defined button click, or a user defined button click. For example, the data can be used to perform a zoom in function or a zoom out function for a window on a screen, or facilitate checking email. The data can be used for text creation, for example by providing a virtual keyboard for typing characters or interpreting motions as letters and characters, or document editing, for example editing strings of characters, block and copying text, pasting text, or deleting text. Other non-limiting examples of commands and controls include control of the playback of multimedia files, such as selecting a multimedia item to play, modifying or muting volume levels, pausing playback, fast forwarding or rewinding, or starting playback at various positions within the file. For image editing, the finger mouse 100 can provide intuitive control and manipulation of the images, for example the rotation of an image, the resizing or scaling of an image, trimming of an image, or other image processing features. The finger mouse 100 can also provide intuitive control for controlling movie editing features. In a configuration, the data can be interpreted different ways by the application, depending on the particular context. For example, if the user was previously reading and not editing a document, sliding a finger across the slide sensor area 128 can function to scroll the document. However, if the user has been making edits to the document, sliding a finger across the slide sensor area 128 can select text. The particular context can depend upon the previous actions of the user, or can be determined, for example, by the focus of the application (e.g., is the focus the entire window, or is the focus relating to a text field within the window.)

The RF transceiver 105 can communicate directly with a computing device that has a compatible wireless interface. The RF transceiver 105 can also communicate with a computing device through a receiver 116. Referring now to FIG. 1D, a receiver 116 can have a RF transceiver 105 for communicating with the finger mouse 100, a controller 117 that can be a processor or microcontroller, a USB transceiver chip 131 for communicating with the computing device, a male USB connector interface 118 for connecting to the USB port of a computing device, and can have a cord 119 between the RF transceiver 105 and the USB connector interface 118. In configurations, the receiver 116 can interface with the computing device using any number of interfaces, including a serial port that can be asynchronous or synchronous, an Ethernet port, a LAN port, a card socket, for example a PCMCIA card slot, a bus interface card, for example an internal ISA or PCI card slot, and, if separately powered, through another wireless interface.

The receiver 116 can be connected to the computing device through a cord 119, permitting placement of the receiver 116 at a distance from the computing device. The cord 119 advantageously allows the receiver 116 to be placed closer to the user to facilitate communications between the finger mouse 100 and the computing device. For example, the receiver 116 can be placed where there is a clear line of sight to the user. Placing the receiver 116 closer to the finger mouse 100 can reduce the RF power consumption of finger mouse 100. Placement of the receiver 116 can also control the zone where a finger mouse 100 can be used. For example, the finger mouse 100 and receiver 116 can use a short range RF protocol, a piconet protocol, or a wireless personal area network (WPAN) protocol such as Infrared Data Association (IrDA), Wireless USB, ZigBee™, or generally an IEEE 802.15 protocol. These protocols have limited ranges and can prevent interference of signals from the receiver 116 and finger mouse 100 from interfering with those of other users. This can be advantageous in public areas or office cubicles where there may be multiple users in relatively close proximity that are simultaneously using finger mice 100 with their individual computing devices.

The receiver 116 can be a dumb receiver that does not process data, for example a Bluetooth™ dongle or a WiFi™ wireless adaptor that plugs into a USB port of the computing device and passes data, signals or messages between the computing device and the finger mouse 100. The receiver 116 can also be incorporated into the computing device, for example as a component of the motherboard of the computing device, or in a card slot. In these configurations, the finger mouse 100 can use a device driver on the computing device to translate the data, signals or messages from the finger mouse 100 into actions to be taken, or commands to be executed, by the computing device.

In a configuration, the finger mouse 100 can perform the processing of motion data into a processed command and send the processed command to the receiver 116. However, the receiver 116 can also be a smart receiver that translates or processes communications received from the finger mouse 100. In a configuration, the receiver 116 can maintain the link with the finger mouse 100, receive communications from the finger mouse 100, process or translate the communications from the finger mouse 100, which can comprise raw data, signals or packetized messages, and produce a processed message that is output using an output interface to the input interface of the computing device. Because the receiver 116 can be powered by the computing device, for example by using power directly from a USB connection to the computing device, performing the processing on the receiver 116 can minimize power consumption on the finger mouse 100 and advantageously extend the useful battery life.

In a configuration, the receiver 116 or finger mouse 100 can emulate a device, for example a computer mouse, by sending messages to the computing device in a standard recognized format. For example, the receiver 116 can send commands and messages to the computing device that would be recognized by the default mouse driver of the computing device. In this way, the receiver 116 can ensure backwards compatibility with a wide range of computing devices without requiring the installation of new device drivers. This advantageously allows the finger mouse 100 to be used with computing devices that use embedded processors or that run proprietary software or operating system where developing device drivers would not be cost effective or possible. The receiver 116 can also enable the finger mouse 100 to interface with devices that run application specific protocols such X10 or Z-Wave, which are used for home automation and the control of home electrical devices such as lamps. The use of various configurations of receivers 116 advantageously allows the use of the finger mouse 100 with a wide variety of electronic devices without requiring changes to the finger mouse 100 itself.

FIG. 1C also has a perspective view of an attachment mechanism for attaching the finger mouse 100 to the user. The band 115 securing the finger mouse 100 to the index finger or any other finger of the human hand 200 can be constructed of various different materials and formed in many different fashions. The band 115 can be constructed of flexible material such as silicone, rubber, elastic fabrics, etc. Constructing the band 115 using flexible materials provides an infinite range of sizing targeting 90% of the finger size population. Users can select the band 115 that best fits. The band 115 can also be constructed of rigid materials such as plastic or metal. Sizing of the band 115 in the case of rigid materials can be accomplished using secondary bands which reduce the inner diameter of the band 115 much like that of sizing a ring to a finger. The band 115 can also be interchangeable, with various inner diameters that fit the same profile. Interchangeable bands can allow stylistic changes or the sharing of a single device amongst several different users. The finger mouse 100 can be attached by various other attaching means, as may be recognized by those of ordinary skill in the art.

Referring now to FIGS. 1E and 1F, an ergonomic finger mouse 120 is presented. The ergonomic finger mouse 120 comprises some of the features and aspects of the finger mouse 100 but further comprises a molded top housing 122 configured to secure to a molded bottom housing 121. When secured, the molded top housing 122 and molded bottom housing 121 form protective recesses that protect a circuit 123 and a flexible sensing circuit 124. A removable finger grip 125 for gripping a finger of a hand is configured to physically attach to the molded bottom housing 121. Together, the molded top housing 122, molded bottom housing 121, and removable finger grip 125 comprise a housing 122, 121, 125. The removable finger grip 125 can work in conjunction with a curved section 126 of the molded bottom housing 121 to attach the ergonomic finger mouse 120 to the finger or an appendage of the user. The removable finger grip 125 can be sized in a range of sizes to fit fingers or thumbs (collectively fingers or digits) or other appendages, such as toes or arms. The removable finger grip 125 facilitates attachment of the ergonomic finger mouse 120 to a wide range of appendage sizes, and is an alternative to a one-size-fits-all type approach. The removable finger grip 125 can be configured to different geometries to accommodate placement on different parts of a finger. For example, the prongs of the removable finger grip 125 can be configured to have different diameters or shapes that facilitate comfortable securing of the ergonomic finger mouse 120 to the underlying bony structures of the finger, known as phalanges. For example, the prongs of the removable finger grip 125 can have an approximately tapered geometry to accommodate placement of the ergonomic finger mouse 120 on the distal and intermediate phalanges. In another example, the prongs of the removable finger grip 125 can be configured to support attachment to the proximal phalanges, without substantially affecting movement of the distal and intermediate phalanges.

The molded top housing 122 can be connected to the molded bottom housing 121 to form a protective recess for the flexible sensing circuit 124. The curved section 126 of the molded bottom housing 121 can function as a support surface for the flexible sensing circuit 124. The curved sensing area 127 in the molded top housing 122 can provide a protective covering for the flexible sensing circuit 124. The curved sensing area 127 can also provide a visual indication of a touch sensor area 129 by raising, lowering, or creating visual markers for where a user is to touch with their finger. The touch sensor area 129 is positioned over the area where the flexible sensing circuit 124 is configured to register finger touches. The curved sensing area 127 can similarly provide a visual indication of a slide sensor area 128 and the flexible sensing circuit 124 underneath is configured to register one or more finger's position within the slide sensor area 128. For example the flexible sensing circuit 124 can be configured to register a sliding motion, for example the translating of a finger across the surface of the slide sensor area 128, or the position of one or more fingers touching within the slide sensor area 128.

The molded top housing 122 can be connected to the molded bottom housing 121 to form a protective recess for the circuit 123. Continuing to refer to FIGS. 1E and 1F, and referring now to FIG. 1H, a circuit 123 is presented. The circuit 123 comprises a USB connector 130, a USB transceiver chip 131, a microcontroller 132, a capacitive sensing chip 108, a gyroscope 107, an accelerometer 106, a flex connector 136 for connecting the flexible sensing circuit 124, a battery module 138 and a second flex connector 137. The capacitive sensing circuit 108 monitors the flexible sensing circuit 124 through the flex connector 136.

Separating the battery module 138 from the circuit 123 provides several advantages. It allows the use of larger batteries as space for the battery is no longer constrained by the placement of the battery in a battery holder on the circuit 123. It also permits the battery module 138 to have a different geometry depending on the application, for example a thin space-saving geometry for lighter weight, or a thicker geometry for longer battery life. Further, it can make it easier to replace the battery module 138, for example for repair and maintenance procedures.

Continuing to refer to FIG. 1G and now referring also to FIG. 1I, a daughter board 150 is presented. The daughter board 150 comprises a transceiver module 148, an RF antenna 151, a vibratory component 152, a sound emitter component 153, an RFID 154 circuit, a pulse oximeter circuit 155, and a GPS 156 circuit. In embodiments, the daughter board 150 can have altimeters (not shown) or magnetometers (not shown) in addition to, or instead of, some of the components shown in FIG. 1G. The daughter board 150 can connect to the circuit 123 through the second flex connector 137. The vibratory component 152 can be a small motor having an irregular unbalanced load or cam. The sound emitter component 153 can be a piezoelectric device. Other vibratory components 152 or sounder emitter components 153 can also be used. In different configurations, the daughter board 150 can be configured with or without a vibratory component 152, and with or without a sound emitter component 153. The vibratory component 152 and sound emitter component 153 can also be placed on the circuit 123 or on the battery module 138. The RFID 154 circuit, pulse oximeter circuit 155, and GPS 156 circuit can provide additional information about the user and the user's environment as described above. The pulse oximeter circuit 155 can be connected to a sensor (not shown) mounted in the band 115, removable finger grip 125, or housing 101, 121, 141 or separately attached to the user.

In a configuration, the RF transceiver module and RF antenna 151 can be located on the circuit 123 or the battery module 138. In FIG. 1I, the RF transceiver module and RF antenna 151 are shown on the daughter board 150. Moving the RF transceiver module 148 and RF antenna 151 off of the circuit 123 reduces the amount of RF shielding and other isolation measures required for the circuit 123. By having the RF transceiver module 148 separate from the circuit 123, it is possible to change the type of wireless interface on the ergonomic finger mouse 120 without having to make hardware changes to the circuit 123. For example, the same circuit 123 can be programmed to operate with a ZigBee™ RF transceiver module, a Bluetooth™ RF transceiver module, or a WiFi™ RF transceiver module. In different configurations, the circuit 123 can be preloaded with a single driver for a specific type of RF transceiver module, or the circuit 123 can be preloaded with a number of drivers for a number of different types of RF transceiver modules. When the circuit 123 is preloaded with a number of drivers, the circuit 123 can automatically determine the type of RF transceiver module, or the circuit 123 can be configured through software, for example by a user or during an initializing step.

Referring again to FIG. 1G, the USB connector 130 can be configured to allow connections to a USB port of a computer 400. The USB transceiver chip 131 that is connected to the USB connector 130 can receive or transmit data from the ergonomic finger mouse 120 to the computer 400. The USB transceiver chip 131 facilitates entering the initial configuration into the ergonomic finger mouse 120, for example configuring the wireless communications parameters. The USB transceiver chip 131 also facilitates updating the internal software of the ergonomic finger mouse 120.

The USB connector 130 can be configured to allow connections to a USB connected power supply (not shown), for example an AC adaptor. The USB connector can also connect to a separate battery unit (not shown), for example a user-carried battery unit. The ergonomic finger mouse 120 can be powered through the USB connector 130, in addition to being powered by the battery module 138. The battery module 138 can be recharged through the USB connector 130.

A microcontroller 132 controls the actions and features of the ergonomic finger mouse 120. The microcontroller 132 receives inputs from the accelerometer 106, the gyroscope 107, and the capacitive sensing circuit 108, and processes the information from those inputs to create a signal that is representative of at least a portion of one or more of the inputs. As described above, the microcontroller 132 can process or convert the raw data from the accelerometer 106 and gyroscope 107 inputs into processed data. The microcontroller 132 can also process or convert the various activations of the buttons 111, 112, 113, touch sensor areas 129, and slide sensor areas 128, into processed data, or merely format the data into the appropriate message format or packet and send a communication to the computing device. The microcontroller 132 can receive the inputs by polling the accelerometer 106, the gyroscope 107, and the capacitive sensing circuit 108. In addition to polling, the inputs can be received through an interrupt driven process, or can be a combination of both polling and interrupts.

The microcontroller 132 can format the signal into a format appropriate for transmission through the USB connector 130. The microcontroller 132 can format the signal into a format appropriate for wireless transmission, for example through an RF transceiver in the circuit 132, daughter board 150, or battery module 138. The microcontroller 132 can run a protocol stack that enables proper handshaking and link establishment, error correction, datagram packetization, and message parsing of communications with a remote receiver, such as a remote computer 400 or smartphone (not shown.) In a configuration, the microcontroller 132 is a message unit. In configurations, the rigid circuit board 103, the circuit 123, the daughter board 150, and the microcontroller 132, or any combination thereof, can be a messaging unit or perform the functions of a messaging unit.

The microcontroller 132 can be implemented using hardware components, software modules or combinations thereof. The microcontroller 132 can include a processor, a microprocessor, a circuit, a central processing unit (CPU), an application specific integrated circuit (ASIC), a programmable logic devices (PLD), a field programmable gate array (FPGA) or any other kind of processor or variety of other suitable electronic components including but not limited to transistors, resistors, capacitors, inductors, logic gates, registers, semiconductor device, chips, a microchip, an integrated circuit, an arithmetic logic unit (ALU), a chipset, an input/output (I/O) device, a random access memory (RAM) such as dynamic RAM (DRAM), and a read only memory (ROM), digital-to-analog and analog-to-digital converters (DAC, ADC), and busses. The microcontroller 132 can be a multi-processing unit, a reduced instruction set computer (RISC), a processor that has a pipeline or parallel threading capabilities, a complex instruction set computer (CISC), or a digital signal processor (DSP). Factors affecting selection of the appropriate microcontroller 132 can include computational rates or processing time, power requirements, heat tolerances, data bus speeds, the types of inputs and outputs available on the microcontroller 132, the input and output data rates, and memory resources.

Software can include operations, code, routines, subroutines, objects, function calls, application program interfaces (API), applications, programs, middleware, operating systems, embedded code, microcode, and firmware. It should be noted that terms such as "processing", "computing", "running", "determining", "calculating", and "converting", or similar terms refer to the various operations of a computing device or microcontroller 132. The above terms are intended as non-limiting examples of operations typically performed by computing devices in order to change, move, or otherwise manipulate data, whether in data structures or not, that are stored in various types of memory.

Referring now to FIG. 1H, a finger mouse with a removable power module 140 is presented. The finger mouse with a removable power module 140 comprises a bottom portion 141 that connects to a removable top portion 142. The bottom portion 141 and removable top portion 142 can mate together using a mechanical connector 143, for example interlocking notches. The bottom portion 141 and removable top portion 142 can mate together using a magnetic connector 144. The bottom portion 141 and removable top portion 142 can be electrically connected using an electrical connection 145, for example a rigid plug and socket mechanism, a flexible wiring harness, a battery-type connector with movable contact members typically found in mobile phones and mobile phone batteries, or a land grid array of pins and electrical contacts. The bottom portion 141 and removable top portion 142 can be electrically connected using inductive coupling.

The bottom portion 141 of the finger mouse with a removable power module 140 can comprise a curved sensing area 127, touch sensor area 129, and slide sensor area 128 similar to the ergonomic finger mouse 120. The top portion 142 can comprise a battery 146, one or more capacitive sense buttons 147, an RF transceiver 148, and one or more visual indicators 149. The capacitive sense buttons 147 can also be a slide-type capacitive sensor, or a combination of one or more capacitive sense buttons 147 and one or more slide-type capacitive sensors.

In operation, the capacitive sense buttons 147 can be used to select which computing device to which the finger mouse with a removable power module 140 will be connected. A visual indicator 149 could provide an indication of which computing device the finger mouse with removable power module 140 is communicating with. For example, a user could select one of the capacitive sense buttons 147 to connect the finger mouse with a removable power module 140 to a laptop or desktop computer 400 using a ZigBee™ connection. The user could select a different capacitive sense button 147 to connect the finger mouse with a removable power module 140 with a smartphone using a Bluetooth™ connection. The user could select another capacitive sense button 147 to connect the finger mouse with a removable power module 140 with an Internet Protocol television (IPTV), Television Over Internet Protocol (TVoIP), gaming system, or set-top box using an IrDA or WiFi™ connection. The finger mouse with a removable power module 140 can be configurable to support any number of finger presses or finger press combinations of the capacitive sense button 147 to control the computing devices or communication links with the computing devices.

FIGS. 2 through 7 and 10 through 11 are perspective views of at least one finger mouse 100 on a human hand 200. For simplicity of discussion purposes only, these perspective views have been limited to the index finger and/or middle finger of the right hand 200 of a human, and should not be viewed as a limitation of the position or use of the finger mouse 100 on a human hand 200. Although the finger mouse 100 is illustrated on a single finger, the finger mouse 100 can be located on a plurality of fingers of either the right hand 200 or the left hand (not shown), or other appendage (not shown), for example by using a larger band 115 as may be understood by a person skilled in the art. The basic position for locating the finger mouse 100 on the index finger of the right hand 200 can be between points 204 and 201 along the length of the finger as shown in FIG. 8. The basic position for locating the finger mouse 100 on the middle finger of the right hand 200 can be between points 209 and 206 along the length of the finger as shown in FIG. 8. This basic position can be replicated along any finger of the human hand 200 allowing for a plurality of finger mouse 100 positions. The finger mouse 100 can be positioned between points 203 and 202 of the index finger, between points 208 and 207 of the middle finger, and between points 205 and 201 of the thumb. This alignment is merely an example and not a limitation of the position of the finger mouse 100 along the length of any finger of either the right hand 200 or the left hand (not shown).

Figure 2:
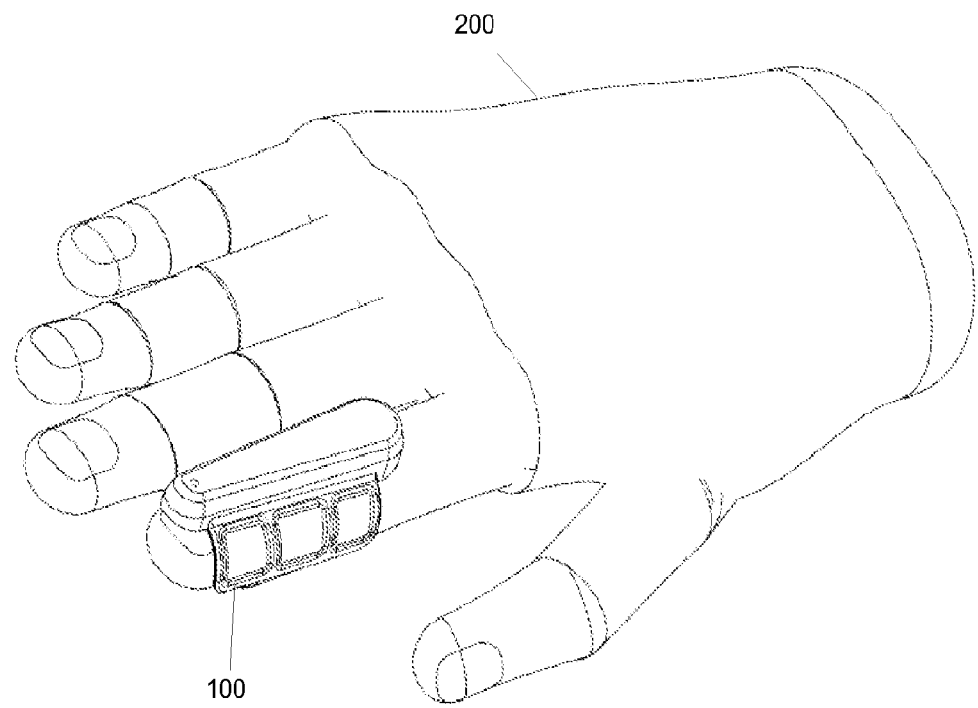
FIG. 2 is a perspective view of a finger mouse on an index finger of a human hand.
Figure 3A:
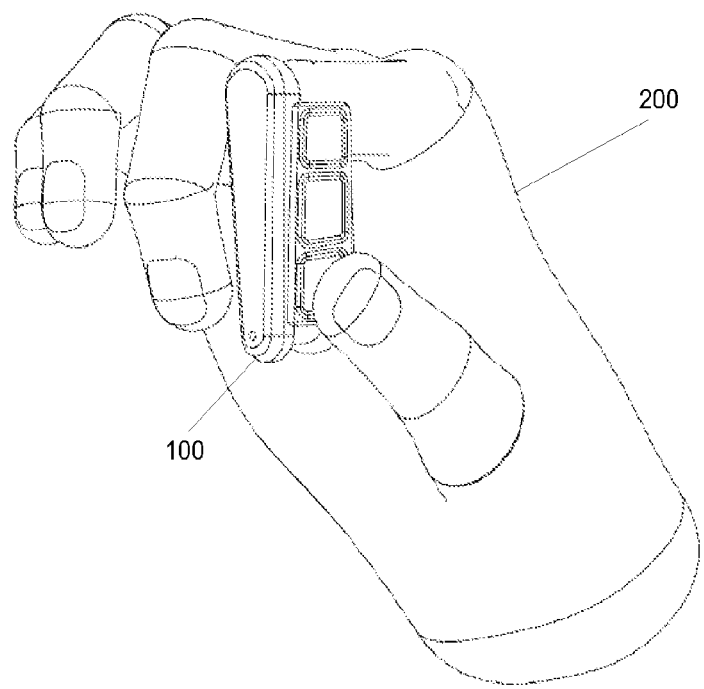
FIG. 3A is a perspective view of a finger mouse on an index finger of a human hand.
Figure 3B:
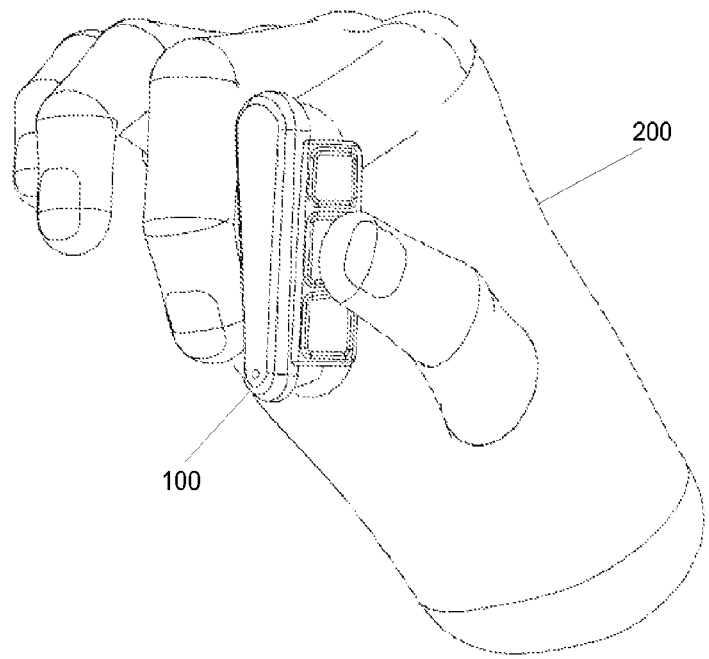
FIG. 3B is a perspective view of a finger mouse on an index finger of a human hand.
Figure 3C:
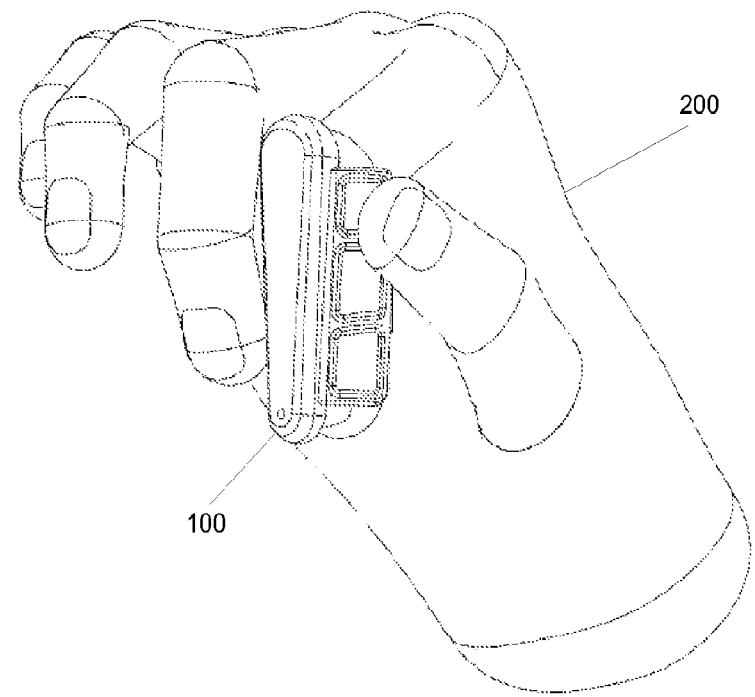
FIG. 3C is a perspective view of a finger mouse on an index finger of a human hand.

FIGS. 2 through 3C are perspective views of finger mouse 100 located on the right hand 200 of a human demonstrating example methods of using the finger mouse 100 to manipulate cursor position; for example, cursor position can be manipulated in a 2D plan video graphic screen such as the video screen 402 of a computer 400. In this example method, cursor movement can be accomplished by maneuvering the thumb next to the index finger supporting the finger mouse 100 and touching one or more buttons 111, 112, 113 activating data collection from sensors within the finger mouse 100. Movement of the finger supporting the finger mouse 100 can be tracked by collecting angular and linear acceleration data. The data collected can be wirelessly transmitted to a computing device, for example, a personal computer 400 or a smart phone (not shown) where the data can be processed. For example, in one configuration, the processed data can translate or move a cursor in a 2D plan video graphic screen such as the video screen 402 of a computer 400. In another configuration, the data collected and wirelessly transmitted to the personal computer 400 or other computing device can be processed as written text, thereby turning the finger mouse 100 into an electronic writing utensil. Moving the finger mouse 100 as a writing device either on a surface or in mid air can create electronic files of transcribed text and drawings, for example signatures, notes, preliminary documents, drawings in hand written form. Movement of the cursor could correlate to the movement of the finger mouse 100. In a configuration, a virtual keyboard can be presented, for example on a screen. When the user moves the finger mouse 100 and the cursor into the area of the virtual keyboard, or performs an action such as selecting a button or performing a tap or sequence of taps or a particular gesture, a virtual finger or virtual hand is presented on the virtual keyboard. The virtual hands or virtual fingers stay over the virtual keyboard and the user can type. For example, if the user has multiple finger mice 100, then those fingers with finger mice 100 can type on the virtual keyboard, with each tap being registered as a keystroke.

In a configuration, limiting accidental activation of cursor functions could be accomplished with the interaction of the thumb and one or more buttons 111, 112, and 113 to makes all cursor functions deliberate and to eliminate the accidental activation of those functions. In a configuration, cursor drift can be controlled by having cursor positioning functions accomplished only during the interaction of the thumb and buttons 111, 112, 113. In another configuration, cursor control can be configured to be activated by a click or double click and deactivated by a succeeding click or double click.

Figure 4:
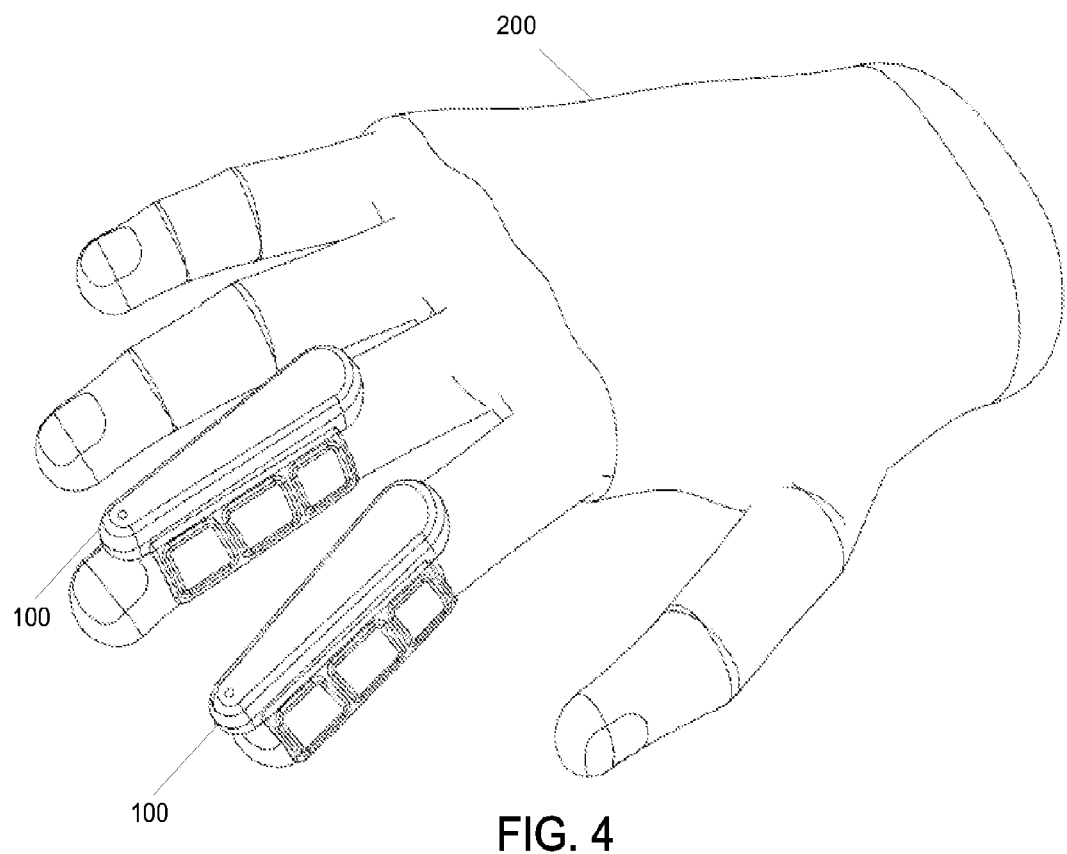
FIG. 4 is a perspective view of two finger mice on two fingers of a human hand.
Figure 5A:
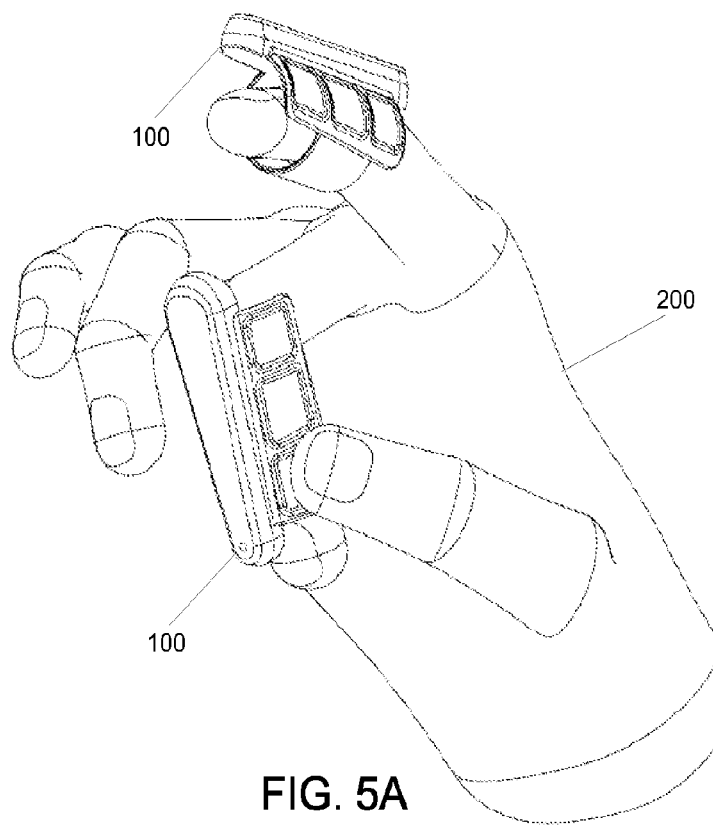
FIG. 5A is a perspective view of two finger mice on two fingers of a human hand.
Figure 5B:
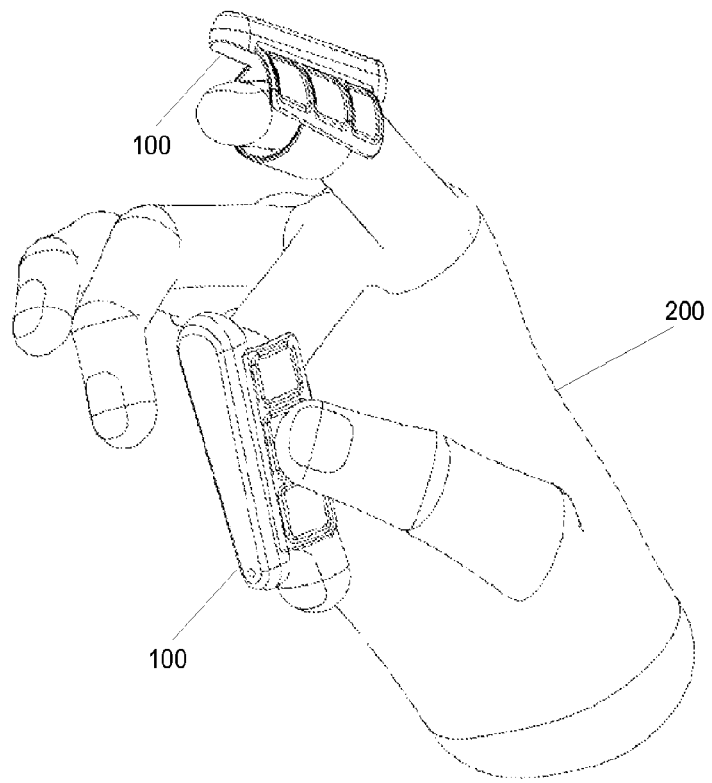
FIG. 5B is a perspective view of two finger mice on two fingers of a human hand.
Figure 5C:
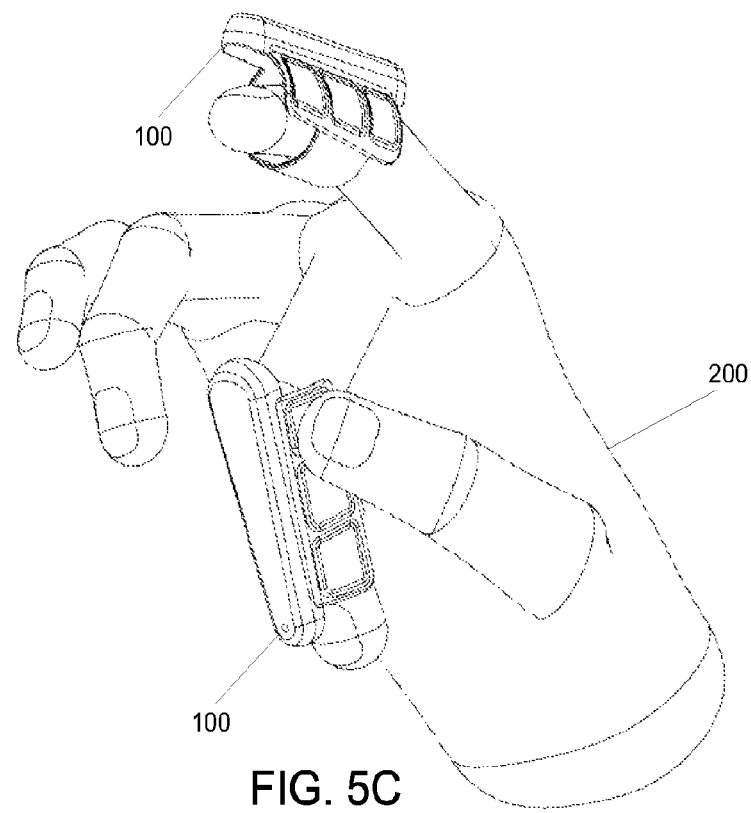
FIG. 5C is a perspective view of two finger mice on two fingers of a human hand.

FIGS. 4 through 5C perspective view a finger mouse 100 on the index finger of the right hand 200 and a second finger mouse 100 on the middle finger of the right hand 200 of a human, demonstrating methods of using the finger mouse 100 to manipulate cursor position, for example in a 2D plan video graphic screen such as the video screen 402 of a computer 400. In a configuration, cursor movement can be accomplished by maneuvering the thumb next to the middle finger supporting the finger mouse 100 and touching one or more buttons 111, 112, 113 activating data collection from sensors within the finger mouse 100. In a configuration, the activation of one or more of buttons 111, 112 and 113 can support such functions as typical media controls, volume, track, advance, forward, reverse, single click functions and multiple click functions. Movement of the finger supporting the finger mouse 100 can be tracked by collecting angular and linear acceleration data. The data collected can be wirelessly transmitted to the personal computer 400 or other computing devices such as smart phones (not shown) where it can be processed. The processed data can function to translate or move a cursor in a 2D plan video graphic screen such as the video screen 402 of a computer 400. Movement of the cursor would correlate to the movement of the finger mouse 100.

Figure 6:
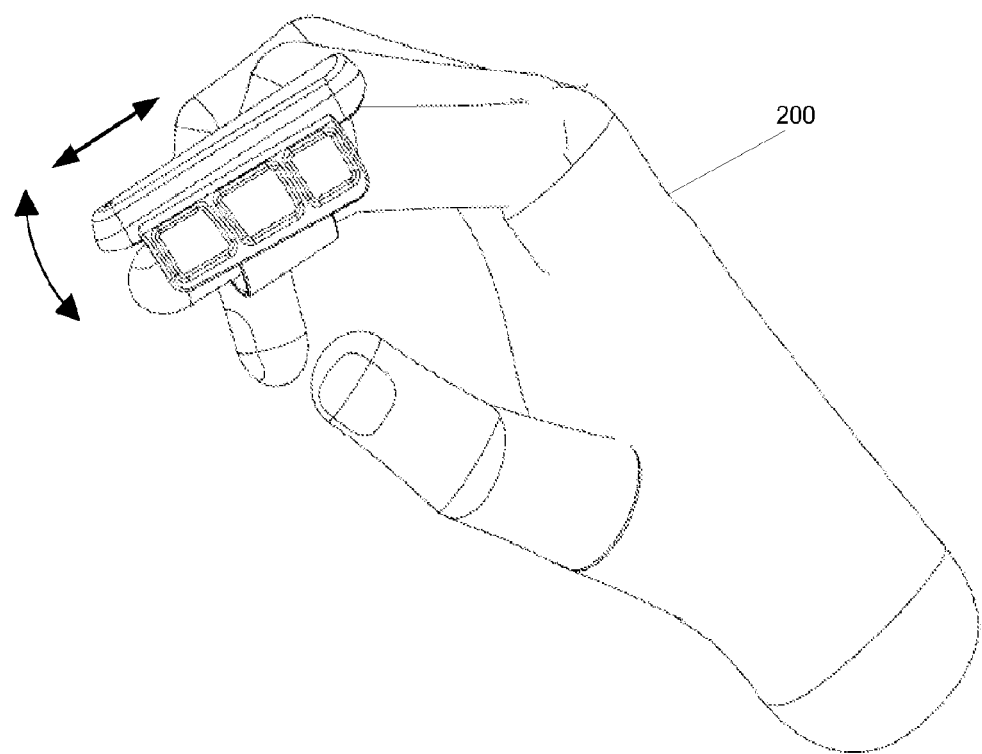
FIG. 6 is a perspective view of a finger mouse on an index finger of a human hand.

In some configurations, non-typical mouse control can be obtained. FIG. 6 presents a configuration of a finger mouse 100 on the index finger of the right hand 200 of a human and demonstrates a method of in air function control. Abrupt movements of the finger mouse 100 such as quick jerking motions could trigger programmed functions according to adjustable acceleration thresholds. The data collected from such action can be wirelessly transmitted to a computing device, for example a personal computer 400 or a smart phone (not shown) where the data can be processed. In turn, the processed data can control actions on the computing device. For example, the processed data can control actions of the cursor in a 2D plan video graphic screen such as the video screen 402 of a computer 400, or a 3D virtual world presented thereon.

Figure 7:
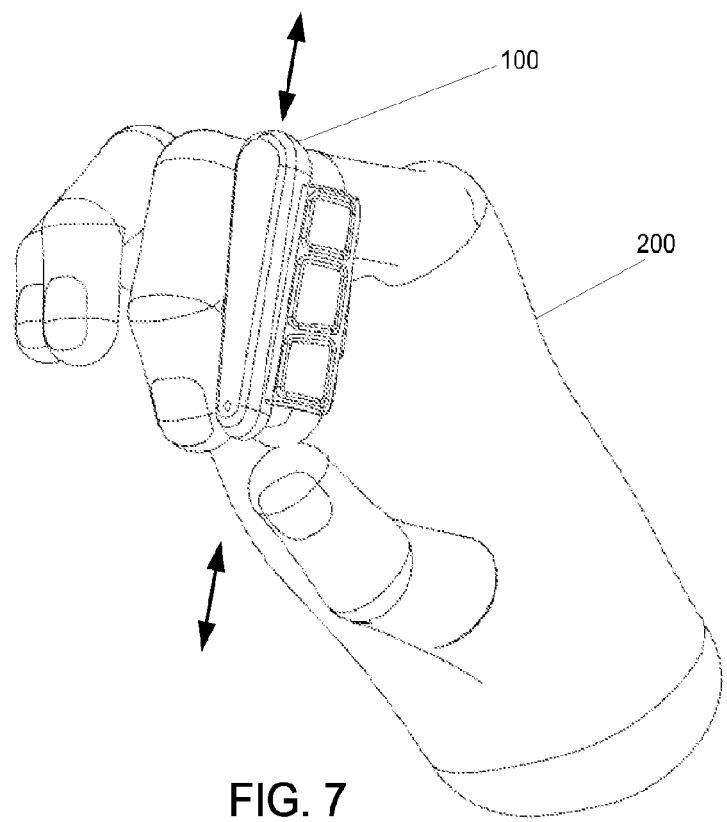
FIG. 7 is a perspective view of a finger mouse on an index finger of a human hand.
Figure 8:
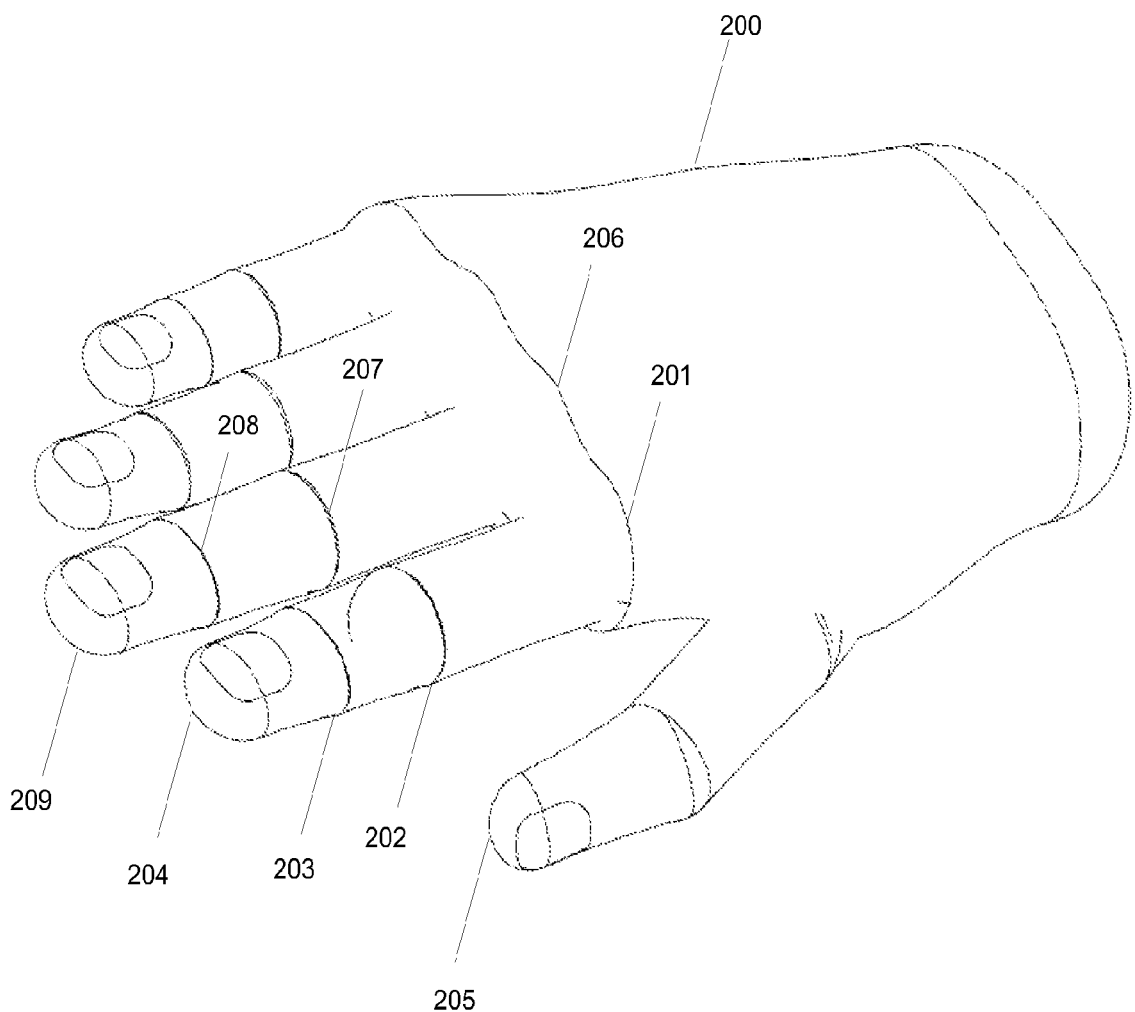
FIG. 8 is a perspective view of a human hand.

FIG. 7 is a perspective view of a finger mouse 100 on the index finger of the right hand 200 of a human and illustrates an embodied method for in detecting tapping for function control. Tapping of the finger, to which the finger mouse 100 is attached, onto an object such as a table, leg, etc, can trigger programmed functions once certain adjustable acceleration thresholds are reached, for example by sending a tap indication in a message to the computing device. The data collected can be wirelessly transmitted to the personal computer 400 or other computing devices such as smart phones (not shown) where it can be processed. For example, the processed data can control actions of the cursor in a 2D plan video graphic screen such as the video screen 402 of a computer 400, or a 3D virtual world presented thereon.

Figure 9:
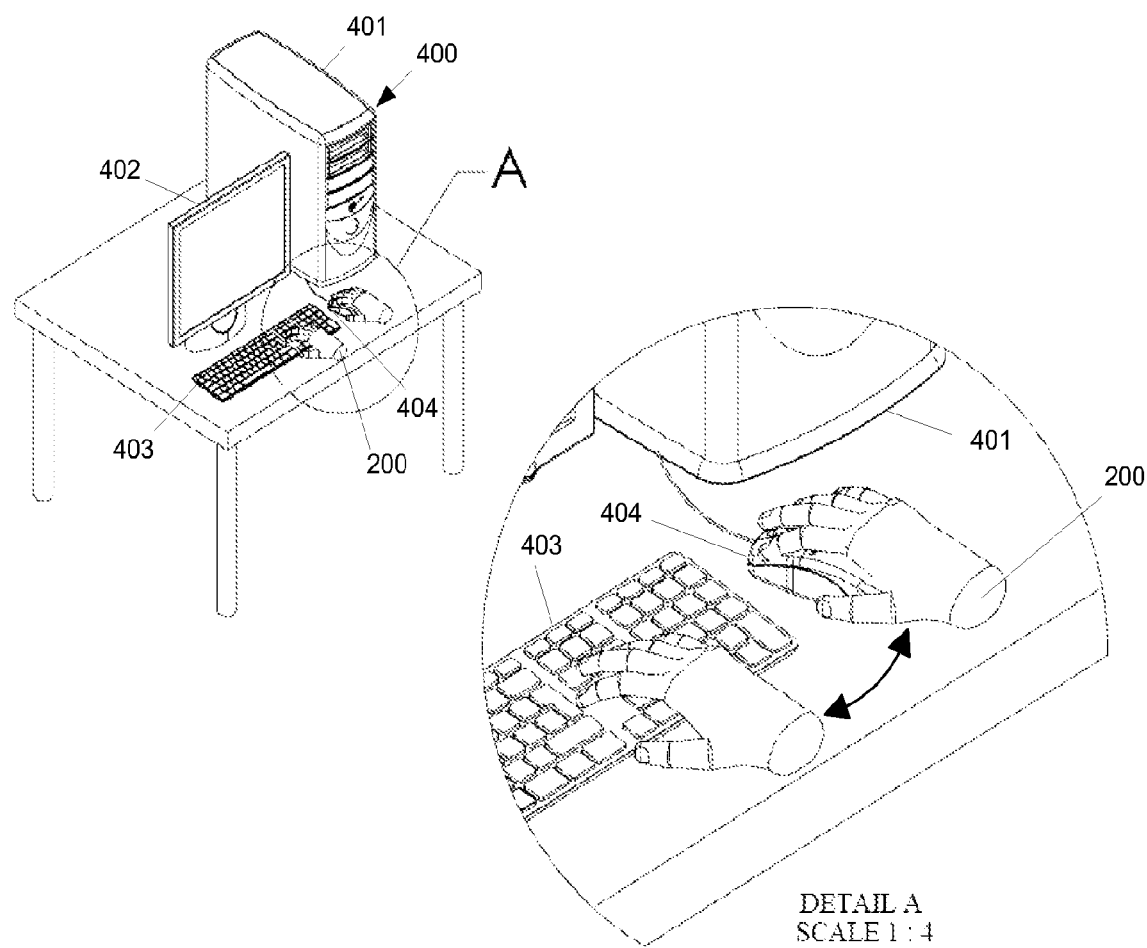
FIG. 9 is a perspective view of a personal computer system.

FIG. 9 presents a prior art personal computer 400 system consisting of a CPU 401, a mouse 404, a keyboard 403, and a monitor or video screen 402. FIG. 9 further presents a prior art pictorial of how the right hand 200 is maneuvered when using a mouse 404 and a keyboard. In such systems, a user must remove a hand 200 from the keyboard in order to engage the mouse and use any available mouse functions.

Figure 10:
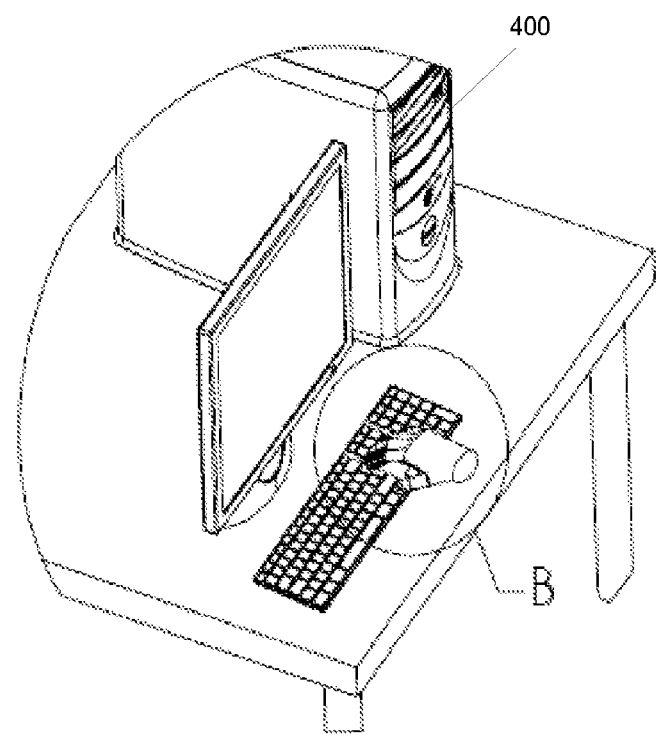
FIG. 10 is a perspective view of a finger mouse on an index finger of a human hand while typing.
Figure 10:
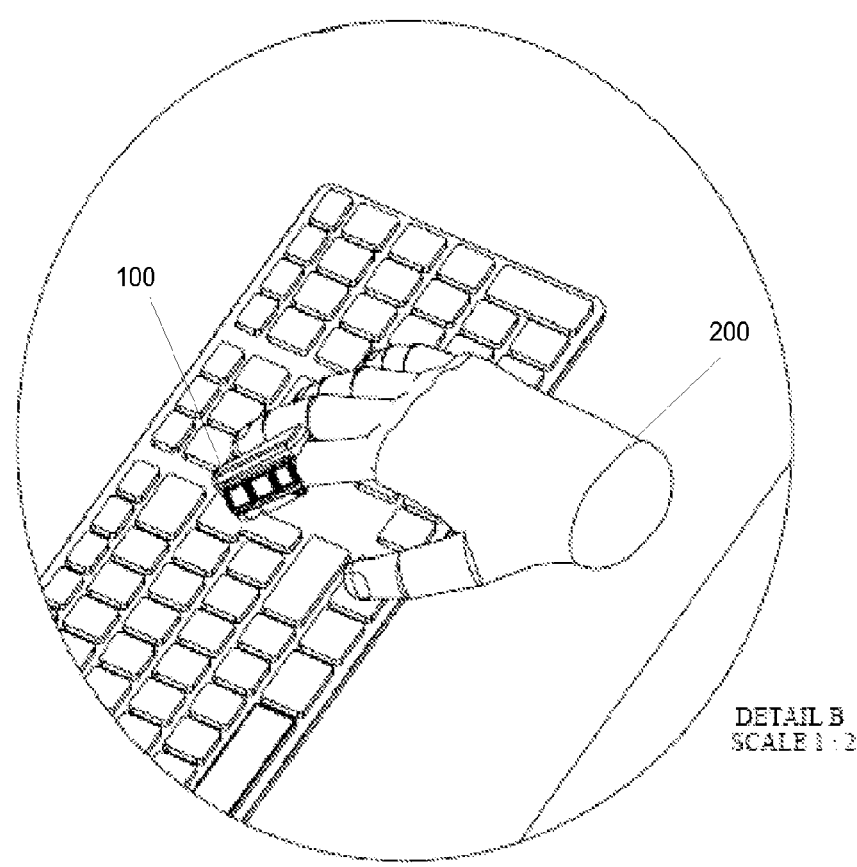

In an example application of the finger mouse 100, the prior art use of a mouse and a keyboard that requires extra movement of the hand 200 in order to use a mouse and that imposes a substantial reduction in typing speed, as well as increased repetition of hand flexion can be overcome. The advantage of the finger mouse 100 over the conventional mouse 404 can be less movement of the hand 200 away from the keyboard to control cursor function and position. Reduced hand movement can have a dramatic effect on reducing hand fatigue which can lead to carpel tunnel syndrome, as well as can greatly increase user interaction speed. FIG. 10 is a perspective view of a finger mouse 100 on one or more fingers of a hand 200 and demonstrates configurations of the finger mouse 100 in use while typing. These configurations can reduce the processing time by eliminating the need to move the hand 200 from the keyboard to engage a mouse-in order to operate mouse type functionality, by locating such functionality in a manner in which the user's fingers do not have to leave the keyboard 403 area. The user can utilize one thumb to activate the finger mouse 100 at the same time the fingers remain on the keys and the other thumb remains on the space bar. The immediate use of mouse functions without the fingers leaving the key pad area can significantly increase typing speed and provide a faster and more ergonomic computing experience.

Figure 11:
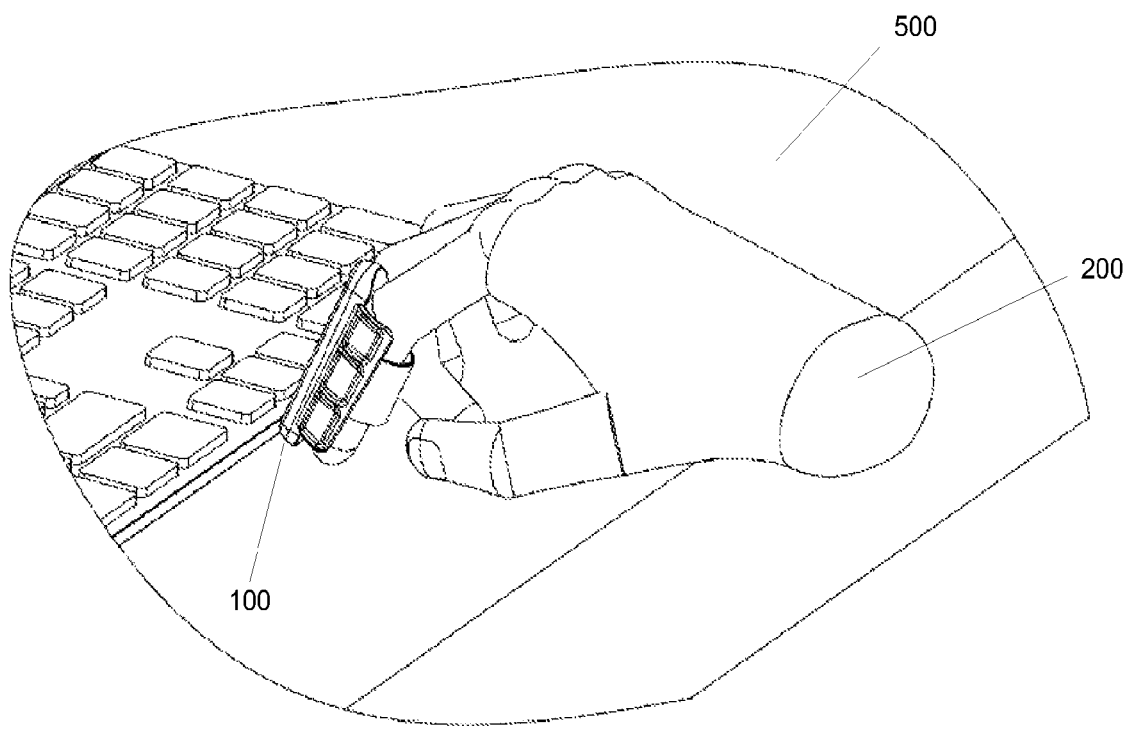
FIG. 11 is a perspective view of a finger mouse on an index finger of a human hand tapping against a surface.

FIG. 11 is a perspective view of a finger mouse 100 on the index finger of the right hand 200 of a human demonstrating the usability of the finger mouse 100 while tapping the index finger. Tapping of the finger, to which the finger mouse 100 resides, onto an object such as a table, leg, etc, could trigger programmed functions once certain thresholds of accelerations are reached, for example by sending a tap indication in a message to the computing device. The data collected on the onset of such an action can be wirelessly transmitted to the personal computer 400 or other computing devices such as smart phones (not shown) where it can be processed. The processed data and function would control actions of the cursor in a 2D plan video graphic screen such as the video screen 402 of a computer 400.

These and other configurations of the finger mouse 100 can be used as an enhancement over current gaming controllers or remote control devices as would be recognized by those skilled in the art. The above descriptions of various components and methods are intended to illustrate specific examples and describe certain ways of making and using the devices disclosed and described here. These descriptions are neither intended to be nor should be taken as an exhaustive list of the possible ways in which these components can be made and used. A number of modifications, including substitutions of components between or among examples and variations among combinations can be made. Those modifications and variations should be apparent to those of ordinary skill in this area after having read this document.

What is claimed is:

1. A method, comprising:
   receiving data associated with at least a portion of a movement of a wearable motion sensing device;
   filtering the data to produce a rate of change of the movement of the wearable motion sensing device;
   integrating the rate of change of the movement to produce a measured movement of the wearable motion sensing device;
   summing the measured movement and an accumulated movement to produce at least one of an updated position of the wearable motion sensing device and an updated orientation of the wearable motion sensing device; and
   updating a feature of a user interface of a computing device based at least in part upon one of the updated position and the updated orientation.

2. The method of claim 1, wherein the data is at least one-axis acceleration data from an accelerometer of the wearable motion sensing device.

3. The method of claim 1, wherein the data is at least one-axis angular rate data from a gyroscope of the wearable motion sensing device.

4. The method of claim 1, further comprising:
   scaling the data.

5. The method of claim 4, wherein the scaling is performed by a scaling function selected from the group consisting of a linear scaling function, an exponential scaling function, a scaling function that scales according to the formula $A_i'=((4/32768)*A_i)*9.81$ where $A_i$ is an acceleration data for a single axis selected from the x, y, and z axes, and a scaling function that scales according to the formula $G_i'=((500\ dps/32786)*(pi/180))*G_i$ where $G_i$ is an angular rate data for a single axis selected from the x, y, and z axes.

6. The method of claim 1, wherein the feature of the user interface of the computing device is a cursor position.

7. The method of claim 6, wherein the cursor position is updated based at least in part upon a scaled measured movement.

8. The method of claim 6, wherein a change of the cursor position in a first axis is produced by a movement in a second axis of the wearable motion sensing device.

9. The method of claim 1, further comprising:
   receiving an indication of a sensor activation of the wearable motion sensing device, and wherein the feature is updated at least in part upon receiving the indication of the sensor activation.

10. The method of claim 1, wherein the feature is selected from the group consisting of a left button click, a right button click, an application defined button click, a user defined button click, a scrolling function, a zoom in function, a zoom out function, an opening of an application, a closing of an application, a checking of an email, an editing of a character, a typing of a character, a copying of a character, a deleting of a character, a pasting of a character, a selecting of a user-selectable option, a sending of an item to a recycle bin, a modifying of a volume level, a muting of a volume, a selecting of a multimedia item, a playing of a multimedia item, a pausing of a multimedia item playback, a changing of a speed of playback of a multimedia item, a rewinding of a playback of a multimedia item, a fast forwarding of a playback of a multimedia item, a skipping of a portion of playback of a multimedia item, a rotation of an image, a resizing of an image, a scaling of an image, a trimming of an image, an image processing of an image, and a movie editing function.

11. The method of claim 1, wherein the filtering is performed by a filter selected from the group consisting of smoothing filter, a high pass filter, a Kalman filter or an iterative algorithm.

12. The method of claim 1, wherein the filtering further comprises:
   selecting a plurality of data points from the data;
   calculating a mean of the selected plurality of data points;
   calculating a standard deviation of the selected plurality of data points;
   comparing the standard deviation with a minimum standard deviation; and
   subtracting the mean from a data point, when the standard deviation is less than the minimum standard deviation, to remove a DC offset from the data point and to produce the rate of change of the movement of the wearable motion sensing device.

13. The method of claim 12, wherein the minimum standard deviation is 0.03 for data associated with an axis of acceleration, and wherein the minimum standard deviation is 0.003 for data associated with an axis of angular rate.

14. The method of claim 12, wherein the operation of selecting a plurality of data points is performed by applying a window function to the data to select about 50 data points.

15. The method of claim 1, further comprising: determining an orientation of the wearable motion sensing device using a measurement of acceleration due to gravity on the wearable motion sensing device.

* * * * *